US011363409B2

(12) United States Patent
Sutherland

(10) Patent No.: US 11,363,409 B2
(45) Date of Patent: Jun. 14, 2022

(54) EMERGENCY ALERT SYSTEMS WITH TRACKED USER INTERACTIONS

(71) Applicant: In-telligent Properties LLC, Chicago, IL (US)

(72) Inventor: Allan C. Sutherland, Orland Park, IL (US)

(73) Assignee: IN-TELLIGENT PROPERTIES LLC, Chicago, IL (US)

( * ) Notice: Subject to any disclaimer, the term of this patent is extended or adjusted under 35 U.S.C. 154(b) by 0 days.

(21) Appl. No.: 17/023,832

(22) Filed: Sep. 17, 2020

(65) Prior Publication Data

US 2022/0007164 A1    Jan. 6, 2022

Related U.S. Application Data

(60) Provisional application No. 62/901,390, filed on Sep. 17, 2019.

(51) Int. Cl.
*H04W 4/02* (2018.01)
*H04W 4/024* (2018.01)
(Continued)

(52) U.S. Cl.
CPC .............. *H04W 4/024* (2018.02); *G08B 7/06* (2013.01); *G08B 25/10* (2013.01);
(Continued)

(58) Field of Classification Search
CPC ......... H04W 4/024; H04W 4/33; H04W 4/90; H04W 76/50; H04W 12/069;
(Continued)

(56) References Cited

U.S. PATENT DOCUMENTS 6,842,628 B1    1/2005 Arnold et al.
7,149,533 B2    12/2006 Laird et al.
(Continued)

FOREIGN PATENT DOCUMENTS

WO    2010009324 A2    1/2010
WO    2014072510 A2    5/2014
(Continued)

OTHER PUBLICATIONS

Apple Is Launching a Vast Project to Map the Inside of Every Large Building It Can, Edwards, Business Insider, Jun. 7, 2014, pp. 1-3.
(Continued)

*Primary Examiner* — Curtis B Odom
(74) *Attorney, Agent, or Firm* — Banner & Witcoff, Ltd.

(57) ABSTRACT

Aspects discussed herein relate to providing alerts to a community of devices located in or near a geographic are such as a building or property. The alerts override any alert-inhibiting state of the mobile device to deliver audio, visual, and/or haptic alerts in emergency situations. The communication and emergency alert system may be used to communicate with many different communities of people. Moreover, certain individuals may be members of more than one community at the same time, and the communities themselves may change over time based both on the user's preferences and on their physical locations. User interaction with their mobile devices and/or provided alerts can be monitored and tracked to determine engagement with the emergency alert system. Additional alerts can be provided on other devices associated with the user until the user is confirmed to have received the alert.

20 Claims, 20 Drawing Sheets

(51) Int. Cl.

| | |
|---|---|
| *H04W 4/33* | (2018.01) |
| *G08B 7/06* | (2006.01) |
| *H04W 4/90* | (2018.01) |
| *H04W 76/50* | (2018.01) |
| *H04W 4/021* | (2018.01) |
| *H04W 4/12* | (2009.01) |
| *H04W 12/069* | (2021.01) |
| *H04L 9/40* | (2022.01) |
| *H04L 67/53* | (2022.01) |
| *G08B 25/10* | (2006.01) |
| *G08B 3/00* | (2006.01) |
| *G08B 5/00* | (2006.01) |
| *G08B 6/00* | (2006.01) |

(52) U.S. Cl.
CPC ...... *H04L 63/0853* (2013.01); *H04L 63/0884* (2013.01); *H04L 67/20* (2013.01); *H04W 4/021* (2013.01); *H04W 4/023* (2013.01); *H04W 4/12* (2013.01); *H04W 4/33* (2018.02); *H04W 4/90* (2018.02); *H04W 12/069* (2021.01); *H04W 76/50* (2018.02); *G08B 3/00* (2013.01); *G08B 5/00* (2013.01); *G08B 6/00* (2013.01)

(58) Field of Classification Search
CPC ....... H04W 4/021; H04W 4/023; H04W 4/12; G08B 7/06; G08B 25/10; H04L 63/0884; H04L 67/20
See application file for complete search history.

(56) References Cited

U.S. PATENT DOCUMENTS

| | | |
|---|---|---|
| 7,180,415 B2 | 2/2007 | Bankert et al. |
| 7,460,020 B2 | 12/2008 | Reyes et al. |
| 7,590,723 B2 | 9/2009 | Mager et al. |
| 8,001,000 B2 | 8/2011 | Butterworth |
| 8,013,734 B2 | 9/2011 | Saigh et al. |
| 8,396,485 B2 | 3/2013 | Grainger et al. |
| 8,624,727 B2 | 1/2014 | Saigh et al. |
| 8,792,906 B2 | 7/2014 | Batada et al. |
| 8,866,673 B2 | 10/2014 | Mendelson |
| 8,971,930 B2 | 3/2015 | Li et al. |
| 9,049,555 B2 | 6/2015 | Wang et al. |
| 9,288,620 B2 | 3/2016 | Menendez |
| 9,351,114 B2 | 5/2016 | Chatterjee et al. |
| 9,363,638 B1 | 6/2016 | Jones |
| 9,549,287 B2 | 1/2017 | Baran et al. |
| 9,589,435 B2 | 3/2017 | Finlow-Bates |
| 9,591,444 B2 | 3/2017 | Qiu |
| 9,712,960 B2 | 7/2017 | Kumar et al. |
| 9,788,153 B1 | 10/2017 | Newstadt et al. |
| 9,788,159 B2 | 10/2017 | Wang et al. |
| 9,826,354 B2 | 11/2017 | Alsina et al. |
| 9,826,358 B2 | 11/2017 | Ryan et al. |
| 9,875,251 B2 | 1/2018 | Jones |
| 9,888,371 B1 | 2/2018 | Jacob |
| 9,900,174 B2 | 2/2018 | Gamberini |
| 10,251,023 B2 | 4/2019 | Sutherland |
| 10,650,665 B2 | 5/2020 | Merjanian et al. |
| 11,146,680 B2 | 10/2021 | Leavitt et al. |
| 2005/0096040 A1 | 5/2005 | Haberman et al. |
| 2005/0197775 A1 | 9/2005 | Smith |
| 2006/0121887 A1 | 6/2006 | Chilukoor |
| 2006/0293048 A1 | 12/2006 | Swanson et al. |
| 2008/0189162 A1 | 8/2008 | Ganong et al. |
| 2010/0121567 A1 | 5/2010 | Mendelson |
| 2010/0231379 A1 | 9/2010 | Hutzler et al. |
| 2011/0112768 A1 | 5/2011 | Doyle |
| 2011/0148634 A1 | 6/2011 | Putz |
| 2012/0084372 A1 | 4/2012 | Cohen |
| 2012/0166016 A1* | 6/2012 | Bartley ................ G08G 5/0082 701/1 |
| 2012/0274866 A1 | 11/2012 | Tada |
| 2012/0327837 A1 | 12/2012 | Harrington et al. |
| 2013/0099977 A1 | 4/2013 | Sheshadri et al. |
| 2013/0203445 A1 | 8/2013 | Grainger et al. |
| 2013/0247094 A1 | 9/2013 | Hardin et al. |
| 2013/0316740 A1 | 11/2013 | Scarafia et al. |
| 2014/0057648 A1 | 2/2014 | Lyman et al. |
| 2014/0066090 A1 | 3/2014 | Henderson |
| 2014/0220883 A1 | 8/2014 | Emigh et al. |
| 2014/0280526 A1 | 9/2014 | Filho |
| 2014/0358666 A1 | 12/2014 | Baghaie et al. |
| 2015/0031388 A1 | 1/2015 | Chatterjee et al. |
| 2015/0111524 A1 | 4/2015 | South |
| 2015/0140924 A1 | 5/2015 | Marathe et al. |
| 2015/0148061 A1 | 5/2015 | Koukoumidis et al. |
| 2015/0223022 A1 | 8/2015 | Kumar et al. |
| 2015/0237470 A1 | 8/2015 | Mayor et al. |
| 2016/0007156 A1 | 1/2016 | Chiou et al. |
| 2016/0047663 A1 | 2/2016 | Iyer et al. |
| 2016/0049064 A1 | 2/2016 | McNabb et al. |
| 2016/0142872 A1 | 5/2016 | Nicholson et al. |
| 2016/0360360 A1 | 12/2016 | Jones |
| 2017/0099579 A1 | 4/2017 | Ryan et al. |
| 2017/0103080 A1 | 4/2017 | Quong |
| 2017/0103410 A1 | 4/2017 | Kerr et al. |
| 2017/0148306 A1 | 5/2017 | Wolfson et al. |
| 2017/0289754 A1 | 10/2017 | Anderson et al. |
| 2017/0311131 A1 | 10/2017 | South et al. |
| 2018/0054713 A1 | 2/2018 | South et al. |
| 2018/0364654 A1 | 12/2018 | Locke et al. |
| 2018/0365942 A1 | 12/2018 | Molloy et al. |
| 2019/0007548 A1 | 1/2019 | Sit et al. |
| 2019/0166457 A1 | 5/2019 | Lipowski et al. |
| 2019/0261145 A1 | 8/2019 | South et al. |
| 2020/0084608 A1 | 3/2020 | Chung et al. |
| 2020/0137441 A1 | 4/2020 | Lee et al. |
| 2021/0076454 A1 | 3/2021 | Palanivel et al. |
| 2021/0158666 A1 | 5/2021 | Derickson |
| 2021/0215789 A1 | 7/2021 | Hu et al. |

FOREIGN PATENT DOCUMENTS

| | | |
|---|---|---|
| WO | 2014089462 A2 | 6/2014 |
| WO | 2014206627 A1 | 12/2014 |
| WO | 2015034904 A1 | 3/2015 |

OTHER PUBLICATIONS

Micro-Location for Internet of Things Equipped Smart Buildings, Zafari et al., arXiv:1501.01539 v1, Jan. 7, 2015, pp. 1-16.

* cited by examiner

| User Name | Device Type | Device Location | Community Memberships | Community Public Key | User Private Key |
|---|---|---|---|---|---|
| John Smith | iPhone | Home | Community A | XDGVD005 | USER1234 |
| Mike Jochnson | Android | Hospital | Hospital | ASDEW030 | USER9873 |
| Jane Doe | Android | Hospital | Hospital | ASDEW030 | USER284 |
| First Name | iPhone | Community A | Community A | XDGVD005 | USER2000 |
| Last Name | Android | Police | Police | POLIC098 | USER3333 |
| Name Name | Android | Fire | Fire | FIRED909 | USER8080 |
| Admin User | iPhone | Community B | Community B | QWERT999 | ADMIN09 |
| Jeff Michael | iPhone | Home | Community C | ULOPY939 | ADMIN10 |
| Stacy Jordan | Android | Home | Fire | FIRED909 | FIRE9087 |
| | Android | Polie | Police | POLIC098 | POLICE09 |

| Community | Public Key |
|---|---|
| Community A | XDGVD005 |
| Community B | QWERT999 |
| Community C | ULOPY939 |
| Police | POLLE098 |
| Fire | FIRED909 |
| Hospital | ASDEW030 |

FIG. 10

| Alert | Spill | 2 for 1 | School Lockdown |
|---|---|---|---|
| Primary Alert Group | Facilities Staff | Customers | Administrators |
| Primary Alert Location | Within 100 meters | Within 100 meters | All Locations |
| Primary Alert | Haptic/Sound/message file | Haptic/message file | Haptic/Sound/message file |
| Primary Alert Rule | Deliver to all Facilities Staff in geofence until at least one responds that they're addressing the issue | Deliver until 10 redemptions | Deliver to all administrators |
| Secondary Alert Criteria | Always | 3 or less responses in 10 minutes | Always |
| Secondary Alert Group | Customer Facing Staff | Customers | Teachers |
| Secondary Alert Location | Within facility | Within 200 meters | Within Facility |
| Secondary Alert | Message file | Haptic/message file | Haptic/Sound/message file |
| Tertiary Alert Criteria | No primary group response within 5 minutes | 5 or less responses in 20 minutes | Lockdown resolved and explanation input by administrator |
| Tertiary Alert Group | Facilities Staff | Customers | Parents |
| Tertiary Alert Location | Within facility | Within facility | All Locations |
| Tertiary Alert | Haptic/Sound/message file | Haptic/message file | Message file |

FIG. 19

EMERGENCY ALERT SYSTEMS WITH TRACKED USER INTERACTIONS

CROSS-REFERENCE TO RELATED APPLICATIONS

The instant application claims priority to U.S. Provisional Patent Application No. 62/901,390, titled "Emergency Alert Systems" and filed Sep. 17, 2019, the disclosure of which is hereby incorporated by reference in its entirety.

FIELD OF USE

Aspects of the disclosure relate generally to communication systems and more specifically to important and emergency alert systems.

BACKGROUND

People use many different systems to send and receive messages with others, including individual emails, group emails, texts to mobile devices, etc. during emergency and time-sensitive events. Existing emergency alert systems like the Federal Emergency Alert System rely on people listening to a radio, television, or similar device to receive their alerts. These devices may interfere with sleep and therefore are usually turned off while people are sleeping or otherwise busy. The precision in which emergency alert systems use for transmitting alerts is further limited to existing telecommunication architecture. For example, if there were a fire in a portion of Orange County, Calif., the existing emergency alerts systems would notify the entire Los Angeles metropolitan area and portions of the surrounding counties. Alert systems utilizing mobile phones are similarly limited as they do not allow for emergency alerts to be audibly provided while the mobile phone is in a silent or do not disturb mode.

Aspects described herein may address these and other problems, and generally improve the quality, efficiency, and speed of emergency alerts by improving the ability of a system to quickly and easily identify groups of people such that these people may be quickly contacted in the event of an emergency.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to communicating with a community of people determined by a geofencing system to be physically in or near a location such as a building or property, wherein the system overrides any alert-inhibiting state in the people's mobile devices (or any other device) to deliver audio or visual alerts in emergency situations. In addition to providing emergency alerts, the present system may be used by building managers to communicate with people living or working in a building, by university administration to communicate with students or instructors on a university campus, by airport management to communicate with travelers passing through the airport, by a stadium operator to communicate with fans at a sporting game, and a variety of other uses. As may be appreciated, the present communication and emergency alert system may be used by many different groups of administrators to communicate with many different communities of people. Moreover, certain individuals may be members of more than one community at the same time, and the communities themselves may change over time based both on the user's preferences and on their physical locations. User interaction with their mobile devices and/or provided alerts can be monitored and tracked to determine engagement with the emergency alert system. Additionally, when users do not interact with an alert in a threshold period of time, additional alerts can be provided on other devices associated with the user until the user is confirmed to have received the alert.

In one embodiment, a computer-implemented method includes obtaining an indication of an alert condition in a building, determining that the alert condition includes an emergency condition in the building, determining a location for a plurality of mobile devices, each mobile device in the plurality of mobile devices being associated with a primary alert group for a community for the building, generating an alert associated with each mobile device in the primary alert group for the building, transmitting each alert to the associated mobile device in the plurality of mobile devices, wherein the alert causes the mobile device to display one or more notifications by overriding an alert-inhibiting state of the mobile device, determining a response has not been received from at least one of the plurality of mobile devices within a threshold period of time, determining a second plurality of mobile devices, each mobile device in the second plurality of mobile devices associated with a secondary alert group for the community for the building, generating a second alert associated with each mobile device in the second plurality of mobile devices for the building, and transmitting the second alert to each mobile device in the second plurality of mobile devices.

In yet another embodiment of the invention, the alert includes at least one notification selected from the group consisting of an audible notification, a visual notification, and a haptic notification.

In still another embodiment of the invention, the computer-implemented method further includes determining a response has not been received from at least one of the second plurality of mobile devices within a second threshold period of time, determining a third plurality of mobile devices, each mobile device in the second plurality of mobile devices associated with a tertiary alert group for the building, generating a third alert associated with each mobile device in the third plurality of mobile devices for the building, and transmitting the third alert to each mobile device in the third plurality of mobile devices.

In yet still another embodiment of the invention, the building includes a school, the primary alert group includes one or more administrators for the school, and the secondary alert group includes one or more teaching staff for the school.

In yet another additional embodiment of the invention, the computer-implemented method further includes obtaining a response from a first mobile device in the primary alert group, wherein the obtained response includes an indication that the first mobile device has been unlocked within a threshold period of time of receiving the alert and determining the first mobile device has viewed the alert.

In still another additional embodiment of the invention, the computer-implemented method further includes generating a blockchain transaction including the alert and an indication of the plurality of mobile devices and transmitting the blockchain transaction to a distributed network system, wherein the blockchain transaction causes the distributed network system to store the blockchain transaction using a blockchain ledger.

In yet still another additional embodiment of the invention, the computer-implemented method further includes based on the determining a response has not been received from at least one of the plurality of mobile devices within a threshold period of time, identifying a secondary device associated with the at least one of the plurality of mobile devices and transmitting the alert to the secondary device.

Yet another embodiment of the invention includes a computing device including a processor and a memory in communication with the processor and storing instructions that, when read by the processor, cause the computing device to obtain an indication of an alert condition in a building, determine that the alert condition includes an emergency condition in the building, determine a location for a plurality of mobile devices, each mobile device in the plurality of mobile devices being associated with a primary alert group for a community for the building, generate an alert associated with each mobile device in the primary alert group for the building, transmit each alert to the associated mobile device in the plurality of mobile devices, wherein the alert causes the mobile device to display one or more notifications by overriding an alert-inhibiting state of the mobile device, determine a response has not been received from at least one of the plurality of mobile devices within a threshold period of time, determine a second plurality of mobile devices, each mobile device in the second plurality of mobile devices associated with a secondary alert group for the community for the building, generate a second alert associated with each mobile device in the second plurality of mobile devices for the building, and transmit the second alert to each mobile device in the second plurality of mobile devices.

In yet another embodiment of the invention, the alert includes at least one notification selected from the group consisting of an audible notification, a visual notification, and a haptic notification.

In still another embodiment of the invention, the instructions, when read by the processor, further cause the computing device to determine a response has not been received from at least one of the second plurality of mobile devices within a second threshold period of time, determine a third plurality of mobile devices, each mobile device in the second plurality of mobile devices associated with a tertiary alert group for the building, generate a third alert associated with each mobile device in the third plurality of mobile devices for the building, and transmit the third alert to each mobile device in the third plurality of mobile devices.

In yet still another embodiment of the invention, the building includes a school, the primary alert group includes one or more administrators for the school, and the secondary alert group includes one or more teaching staff for the school.

In yet another additional embodiment of the invention, the instructions, when read by the processor, further cause the computing device to obtain a response from a first mobile device in the primary alert group, wherein the obtained response includes an indication that the first mobile device has been unlocked within a threshold period of time of receiving the alert and determine the first mobile device has viewed the alert.

In still another additional embodiment of the invention, the instructions, when read by the processor, further cause the computing device to generate a blockchain transaction including the alert and an indication of the plurality of mobile devices and transmit the blockchain transaction to a distributed network system, wherein the blockchain transaction causes the distributed network system to store the blockchain transaction using a blockchain ledger.

In yet still another additional embodiment of the invention, the instructions, when read by the processor, further cause the computing device to based on the determining a response has not been received from at least one of the plurality of mobile devices within a threshold period of time, identify a secondary device associated with the at least one of the plurality of mobile devices and transmit the alert to the secondary device.

Still another embodiment of the invention includes a non-transitory machine-readable medium storing instructions that, when executed by one or more processors, cause the one or more processors to perform steps including obtaining an indication of an alert condition in a building, determining that the alert condition includes an emergency condition in the building, determining a location for a plurality of mobile devices, each mobile device in the plurality of mobile devices being associated with a primary alert group for a community for the building, generating an alert associated with each mobile device in the primary alert group for the building, transmitting each alert to the associated mobile device in the plurality of mobile devices, wherein the alert causes the mobile device to display one or more notifications by overriding an alert-inhibiting state of the mobile device, determining a response has not been received from at least one of the plurality of mobile devices within a threshold period of time, determining a second plurality of mobile devices, each mobile device in the second plurality of mobile devices associated with a secondary alert group for the community for the building, generating a second alert associated with each mobile device in the second plurality of mobile devices for the building, and transmitting the second alert to each mobile device in the second plurality of mobile devices.

In yet another embodiment of the invention, the alert includes at least one notification selected from the group consisting of an audible notification, a visual notification, and a haptic notification.

In still another embodiment of the invention, the instructions, when executed by one or more processors, further cause the one or more processors to perform steps including determining a response has not been received from at least one of the second plurality of mobile devices within a second threshold period of time, determining a third plurality of mobile devices, each mobile device in the second plurality of mobile devices associated with a tertiary alert group for the building, generating a third alert associated with each mobile device in the third plurality of mobile devices for the building, and transmitting the third alert to each mobile device in the third plurality of mobile devices.

In yet still another embodiment of the invention, the instructions, when executed by one or more processors, further cause the one or more processors to perform steps including generating a blockchain transaction including the alert and an indication of the plurality of mobile devices and transmitting the blockchain transaction to a distributed network system, wherein the blockchain transaction causes the distributed network system to store the blockchain transaction using a blockchain ledger.

In yet another additional embodiment of the invention, the instructions, when executed by one or more processors, further cause the one or more processors to perform steps including based on the determining a response has not been received from at least one of the plurality of mobile devices within a threshold period of time, identifying a secondary device associated with the at least one of the plurality of mobile devices and transmitting the alert to the secondary device.

In still another additional embodiment of the invention, the building includes a school, the primary alert group includes one or more administrators for the school, and the secondary alert group includes one or more teaching staff for the school.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts a community database according to one or more aspects of the disclosure;

FIG. 9 depicts an alert database according to one or more aspects of the disclosure;

FIG. 10 depicts a setup database according to one or more aspects of the disclosure;

FIG. 19 depicts an alert routing database according to one or more aspects of the disclosure.

DETAILED DESCRIPTION

Figure 1:
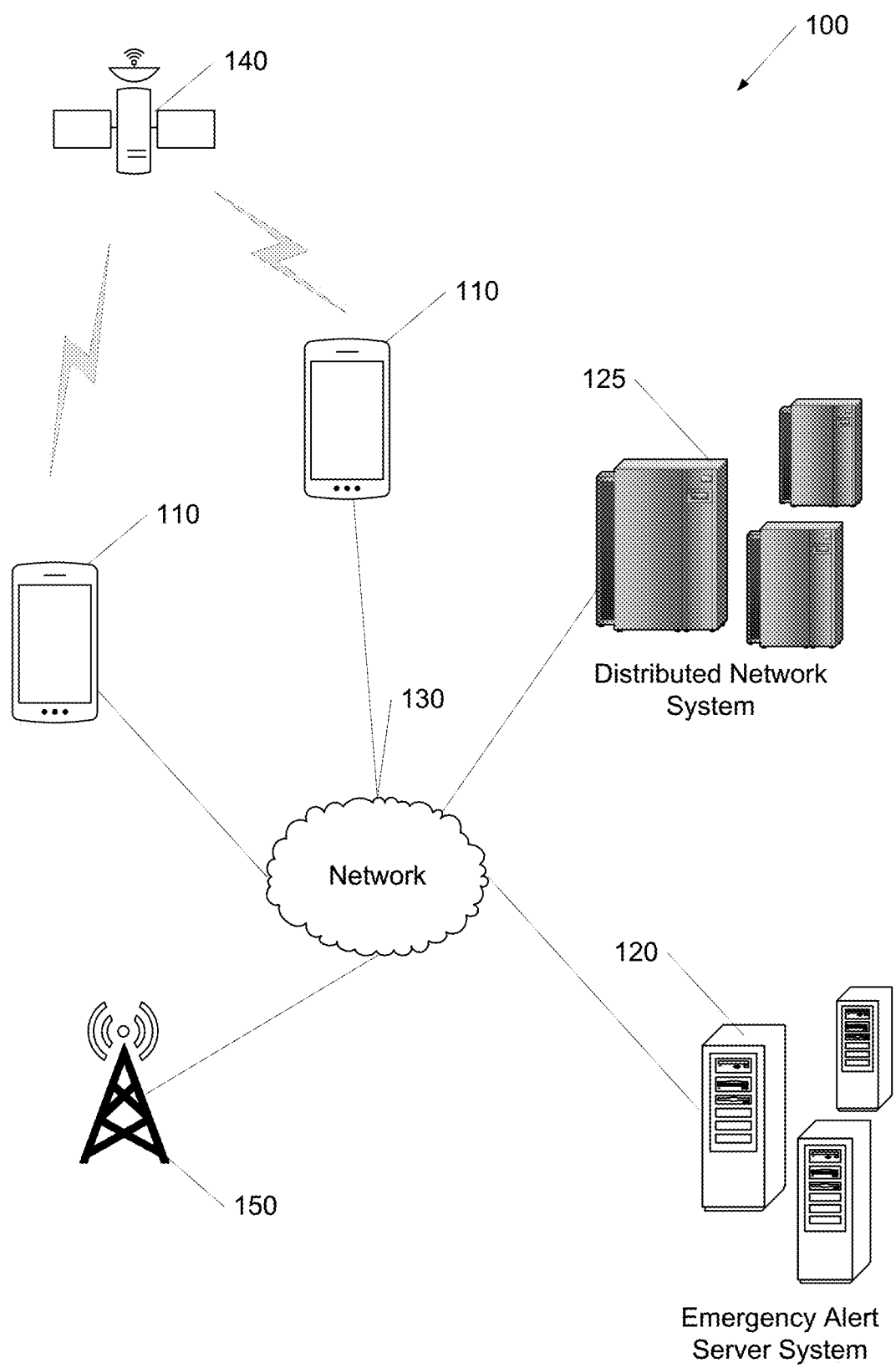
FIG. 1 illustrates an example of an emergency alert system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Emergency alert systems may override any alert-inhibiting state in a person's mobile device to deliver an audio or visual alert in an emergency. Emergency alert systems provide a method of communicating with members of a community by using geofencing to determine the location of users such that they may optionally be automatically added to a community. Members may be auto-subscribed into the community based on their physical locations. These subscriptions may change from time to time as the mobile device moves. Users may also be added to a community based on their own user preferences. People may be members of more than one community and the communities may change over time. A variety of systems and methods for establishing the location of a mobile device and providing alerts to the mobile device in accordance with embodiments of the invention are described in U.S. Pat. No. 10,251,023, titled "Notification and Communication System using Geofencing to Identify Members of a Community" and issued Apr. 2, 2019, the disclosure of which is hereby incorporated by reference in its entirety.

For example, emergency alert systems in accordance with embodiments of the invention can communicate with members of a community by using geofencing to determine the location of users such that they can optionally be automatically added to a community. As such, members may be auto-subscribed into the community based on their physical locations (which may change from time to time). Members or users can also be added to the community based on their own user preferences. People can be members of more than one community and the communities can change over time. Geofencing systems can be used to determine whether a particular mobile device is physically present in a geographic region or area or range (for example, in a building or on a property) based upon the physical location of the smartphone. If the user's phone is determined to be on the property, the user's phone can be automatically added to the property community. In cases where the mobile device is determined not to be physically present on the property (e.g. not detected by proximity sensors in the location), the user can be provided with the option of voluntarily subscribing to join the community. In this way, interested users (e.g.: building tenants who are away at work, or persons working at different jobsites) can be kept informed of developments and alerts with regard to a particular property community even when they are physically away from that property.

Emergency alert systems determine the "alert state" of each of the individuals' smart devices. This can be accomplished by sending a signal to the user's mobile device to determine if the "silent" or "do not disturb" setting is on. If the mobile device setting is alert-enabled (e.g. the "do not disturb" or "silent" function is not turned on), then the mobile device is ready to receive alert messages at step 210. However, in those cases where the mobile device is not alert-enabled (e.g. the "do not disturb" or "silent" function is turned on), then one of two options is possible. First, the user can be sent a message asking if the alert setting can be switched to alert-enabled. Should the user agree and grant permission, then the alert enabled setting is enabled (e.g. the "do not disturb" or "silent" function is overridden). Alternatively, the present system may instead automatically override the "do not disturb" or "silent" function, thereby enabling the mobile device to receive alerts and communications from the emergency alert system irrespective of the "do not disturb" or "silent" function. As such, an important advantage of the present system is that it can be prioritized over typical email, text, and notification traffic, even when the user's phone is set on silent, and warn building or property occupants in the event of an emergency situation such as a fire, crime, or medical emergency.

In addition to sending safety alerts, emergency alert systems can send property-specific (and/or interest group-specific) messages and non-property-specific messages (e.g. messages appealing to more than one property or interest group-specific group). The property-specific messages and the non-property-specific messages may be sent with the smartphone's "do not disturb" or "silent" function overridden and turned off. However, the more likely desired setting may be having the property-specific messages and non-property-specific messages subject to the smartphone's "do not disturb" or "silent" settings. Emergency alert systems can be configured such that only safety alert messages will override the smartphone's "do not disturb" or "silent" settings while other messages (e.g.: building advertisements/messages) will not override the smartphone's "do not disturb" or "silent" settings. The settings used can optionally be set by members of the community themselves, either by the manager or administrator of the community, or both. This is desirable such that users/community members receive safety alerts such as "fire" or "active shooter in the building" without such messages being silenced, but are able to block, silence, or turn off messages like "lunch specials in the building's cafe." In preferred aspects, such advertising may be targeted and, for example, by being tailored to businesses within a 2 to 3 block radius around building. Moreover, when the user/community member first registers with the present system, they can be asked a series of questions to better target the advertising to their desires in addition to their location.

FIG. 1 illustrates an emergency alert system 100 in accordance with an embodiment of the invention. The emergency alert system 100 includes at least one client device 110, at least one emergency alert server system 120, and/or a distributed network system 125 in communication via a network 130. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

The distributed network system 125 can include one or more computing nodes that provide a geographically- and/or computationally-distributed system for storing blockchain ledgers. The computing nodes can include privately available and/or publicly available computing devices. Any of the data and/or databases described herein can be stored using a blockchain ledger. Each computing node within the distributed network system 125 can store some or all of the blockchain ledger. In this way, the distributed network system 125 can store the blockchain ledger in a distributed manner that is resilient to outages in both particular computing devices and/or geographic areas. In several embodiments, the client devices 110 and/or emergency alert server system 120 act as nodes within the distributed network system 125.

Client devices 110 may provide data to and/or obtain data from the at least one emergency alert server system 120 as described herein. The client devices 110 may determine their geographic location using a variety of location-determination techniques, including receiving positioning signals from positioning system satellites 140, cellular tower triangulation, WiFi positioning systems, geocoding systems, and the like. Emergency alert server systems 120 may store and process a variety of data as described herein. The network 130 may include a local area network (LAN), a wide area network (WAN), a wireless telecommunications network, and/or any other communication network or combination thereof.

The emergency alert system may also include a variety of virtual border transmitters 150. Virtual border transmitters may broadcast a signal that is capable of determining when an object, such as a person, mobile device, vehicle, and the like, enters or crosses a particular geographic location. The virtual border transmitter may be able to determine its own location via a variety of technologies, such as via GPS, and/or be preprogrammed to know its location. In this way, the virtual border transmitter may be used to create a virtual fence around a particular geographic area. In several embodiments, a number of virtual border transmitters are installed in a specific geographic region to create a virtual border around a particular geographic region. In many embodiments, a virtual border transmitter is installed in a vehicle (or other moving object) that may detect movement in an area surrounding the vehicle. In this way, specific geofenced areas may be created, either in fixed locations or in moving locations.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the emergency alert system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the emergency alert system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the emergency alert system 100 in front of one or more computing devices such that any external devices may communicate directly with the specialized hardware.

Figure 2:
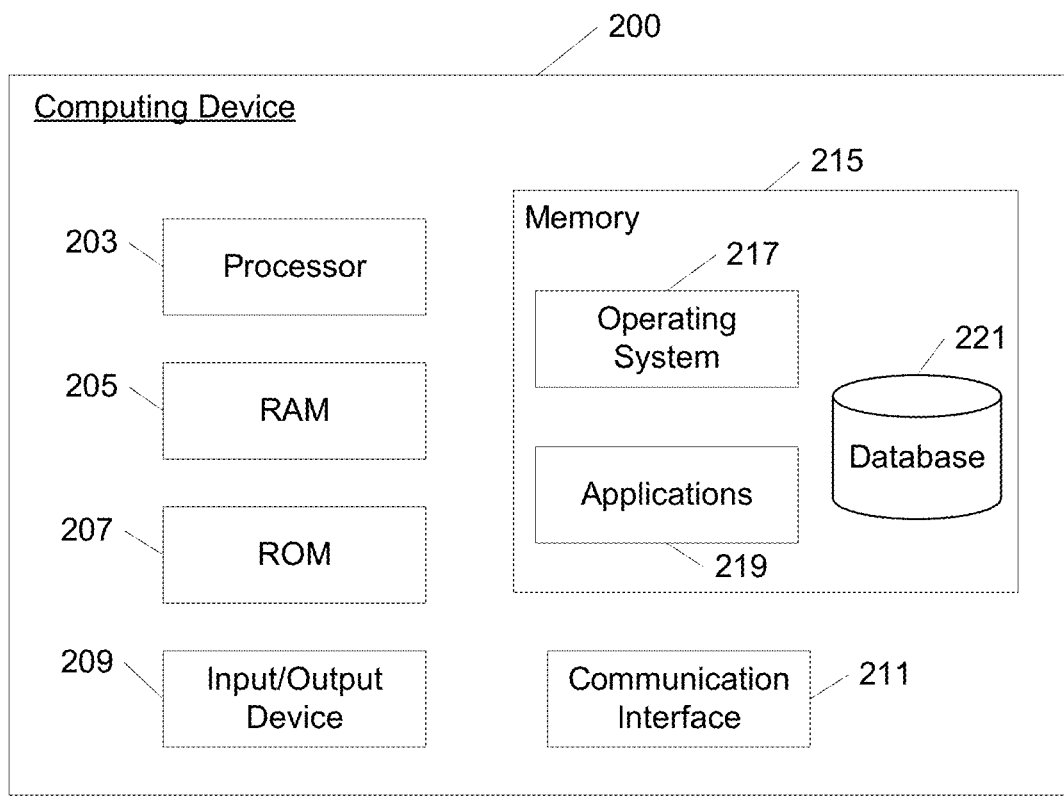
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
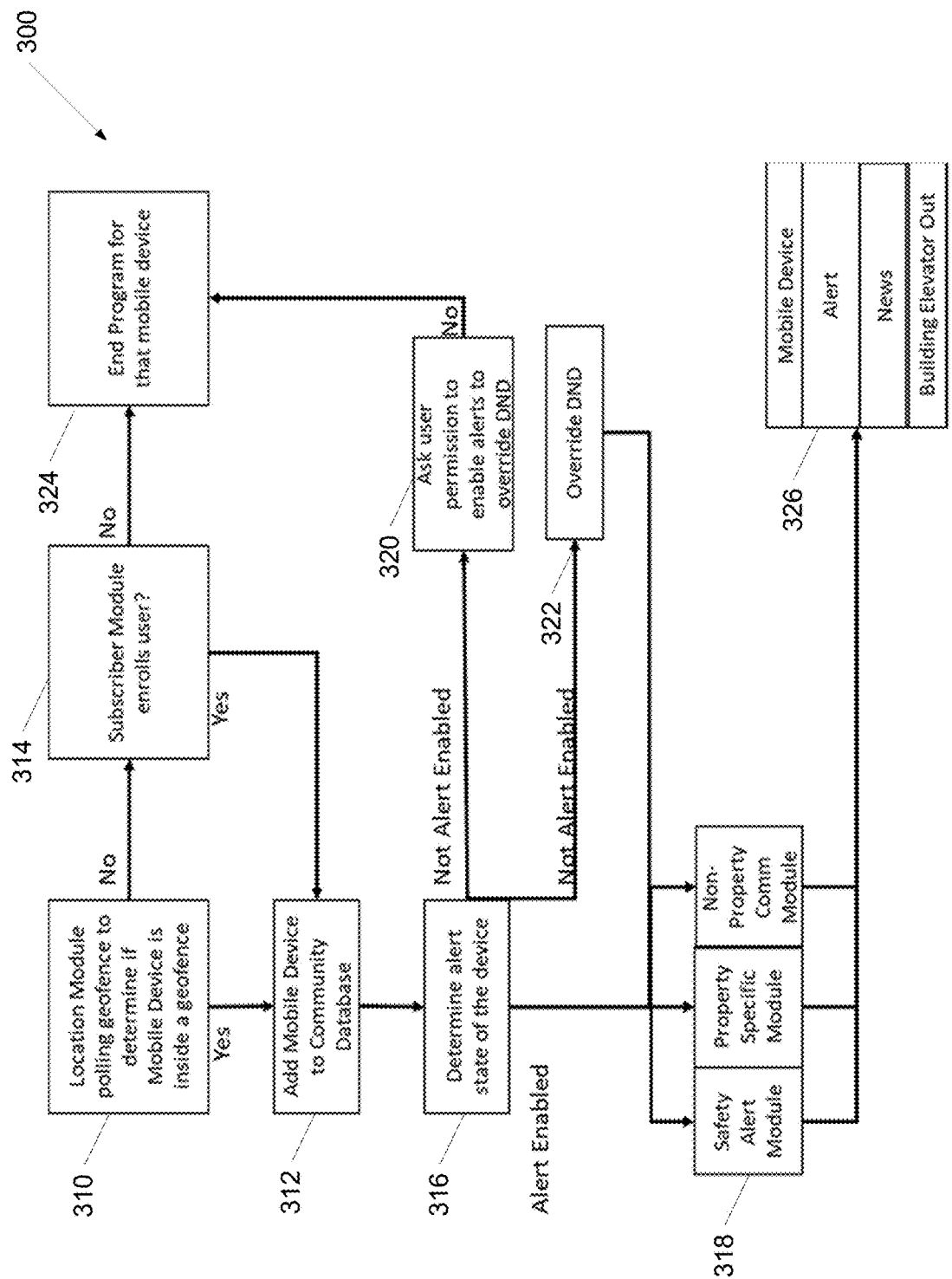
FIG. 3 illustrates a process for providing an emergency alert in accordance with one or more aspects described herein.

FIG. 3 illustrates a process for providing an emergency alerts to members of a community in accordance with one or more aspects described herein. Some or all of the steps of process 300 may be performed using any of the computing devices and/or combination thereof described herein. In a variety of embodiments, some or all of the steps described below may be combined and/or divided into sub-steps as appropriate.

At step 310, it can be determined if a mobile device is located within a particular region. For example, an emergency alert server system, using a geofencing and/or GPS systems, can determine whether a mobile device associated with a particular user is physically present in a geographic region or area or range (e.g. In a building or on a property) based upon the physical location of the mobile device. In several embodiments, the physical location of the mobile device can be determined based on a GPS location augmented using one or more beacons located in the geographic region. At step 312, if the user's mobile device is determined to be on the property, the user's mobile device can be automatically added to a community database. In several embodiments, the mobile device can be added to the community database by the emergency alert server system. At step 314, in cases where the user's mobile device is determined not to be physically present on the property (e.g. not detected by proximity sensors), the user can be provided with the option of voluntarily subscribing to join the community (e.g. enter the user's mobile device into the community database) by providing a subscription request on the mobile device. In this way, interested users (e.g. building tenants who are away at work, persons working at different job sites, and the like) can be kept informed of developments and alerts with regard to a particular property community even when they are physically away from that property. If the mobile device does not subscribe to the community, the process can end at step 324.

At step 316, the alert state of each of the subscribed user's mobile devices can be determined. This can be accomplished by sending a signal to the mobile device to determine if the mobile device's "silent" or "do not disturb" setting is on. If the mobile device setting is alert-enabled (e.g. the "do not disturb" or "silent" function is not turned on), then the mobile device is ready to receive alert messages. However, in those cases where the mobile device is not alert-enabled (e.g. the "do not disturb" or "silent" function is turned on), then one of two options is possible. First, at step 320, a message can be sent to the user asking if the alert setting can be switched to alert-enabled. Should the user agree and grant permission, then the alert enabled setting is enabled (e.g. the "do not disturb" or "silent" function is overridden). If the user does not agree to set the mobile device to an alert-enabled state, the process can end at step 324. Second, at step 322, the system may instead proceed directly to automatically override the "do not disturb" or "silent" function, thereby enabling the mobile device to receive alerts and communications from system.

At step 318, a variety of messages can be sent using the emergency alert server system. In addition to sending safety alerts through the safety alert module, the emergency alert server system also can send property-specific (or interest group-specific) messages using the property specific module and non-property-specific messages (e.g. Messages appealing to more than one property or interest group-specific group) using the non-property communication module. In various embodiments of the system, the property-specific messages sent by the property specific module and the non-property-specific messages sent by the non-property communication module may be sent with the "do not disturb" or "silent" function (e.g. an alert-inhibiting setting) of the mobile device overridden and turned off. However, the more likely desired setting may be to have the property-specific messages sent by the property specific module and non-property-specific messages sent by the non-property communication module are subject to the "do not disturb" or "silent" settings of the mobile device. In such a case, the emergency alert system can be configured such that only safety alert messages will override the "do not disturb" or "silent" settings of the mobile device, while other messages (e.g. Building advertisements and/or messages) will not override the "do not disturb" or "silent" settings. The settings used can optionally be set by members of the community themselves, by the manager or administrator of the community, or both. This is desirable such that users/community members receive safety alerts such as "fire" or "active shooter in the building" without such messages being silenced, but can block, silence, and/or turn off messages like "lunch specials in the building's café." These various alerts can be provided via the mobile device in step 326. The alerts may be provided using any audible, visual, and/or haptic notifications indicated in the alert.

An emergency alert server system can continuously monitor a variety of sensors for sensor data indicating an alert state, such as a fire detected. When the emergency alert server system determines that an alert condition exists, the emergency alert server system can generate and deliver a variety of alerts corresponding to the detected alert condition. If no alert condition is detected by the sensors, the emergency alert server system can obtain a user-provided alert condition. An alert database can store a variety of alerts and alert characteristics, such as the messaging, sounds, display, haptics, etc., as well as the community and role(s) within that community that is to receive the alert generated by the emergency alert server system. For example, when fire is detected by a sensor in a given location, that alert condition can be associated with an alert having an evacuation message, a siren type sound notification at max volume for five-second bursts, and a specified vibration pattern. The notifications indicated in the alert can be displayed on the mobile device associated with users that are in any community and/or within a threshold distance of the building around the fire sensor. Additionally, alerts can also be generated and sent to administrators in the community associated with ownership of the building.

The emergency alert system can secure data and messaging across all the communities sending messages or alerts via the emergency alert system. In a variety of embodiments, the emergency alert system uses a blockchain ledger to create a secure record of alerts and information that are only accessible to user or subscribers of the system. A blockchain ledger can be used for several purposes including, but not limited to, liability analysis, auditing, and event tracing, as the blockchain ledger creates an unalterable record of alerts generated and sent by the emergency alert system. Additionally, delivery of the alerts to a particular mobile device and/or interaction with the delivered alerts by a mobile device can be indicated on the blockchain ledger. For example, if a user or subscriber believes they were injured because they were not alerted, the blockchain ledger can be used to show that the mobile device associated with the user received and displayed the mobile alert and the user dismissed the alert without taking any action.

The emergency alert server system can monitor for the delivery of alerts to mobile device(s) indicated in a community database. Upon detecting the delivery of an alert, the emergency alert server system can generate a blockchain transaction indicating information about that alert, such as timing, content, alert condition, recipient(s), etc. The emergency alert server system can store the blockchain transaction to a blockchain database. The blockchain database can be stored using the emergency alert server system and/or a distributed network system. Distributed network systems can store, modify, and/or execute blockchain ledgers, such as by validating a blockchain transaction and/or adding the blockchain transaction to the blockchain ledger. A distributed network system may be publicly accessible and/or have restricted access. Access to a distributed network system may be limited to particular computing devices as appropriate. The emergency alert server system can obtain, depending upon the alert condition, a user response to the delivered alert. The user response can include an indication that the user viewed the alert. In many embodiments, the user having viewed the alert can be indicated by the user having interacted with their mobile device after the alert was delivered to and/or displayed by an emergency alert application executing on the mobile device, where the emergency alert application can display one or more notifications indicated in the alert by overriding any alert-inhibiting state of the mobile device as described herein. The user response can include any responses to prompts and/or questions provided in the alert, such as a request for additional information about an alert condition, the user's response to the alert condition, and the like. A user response may be received and a blockchain transaction indicating the user response and/or alert information can be stored using the blockchain ledger to create an immutable audit trail of alerts. The community database can store all the different communities that users are a part of and all the associated public keys for blockchain alerts to allow subscribed community members to receive the alerts.

Figure 4:
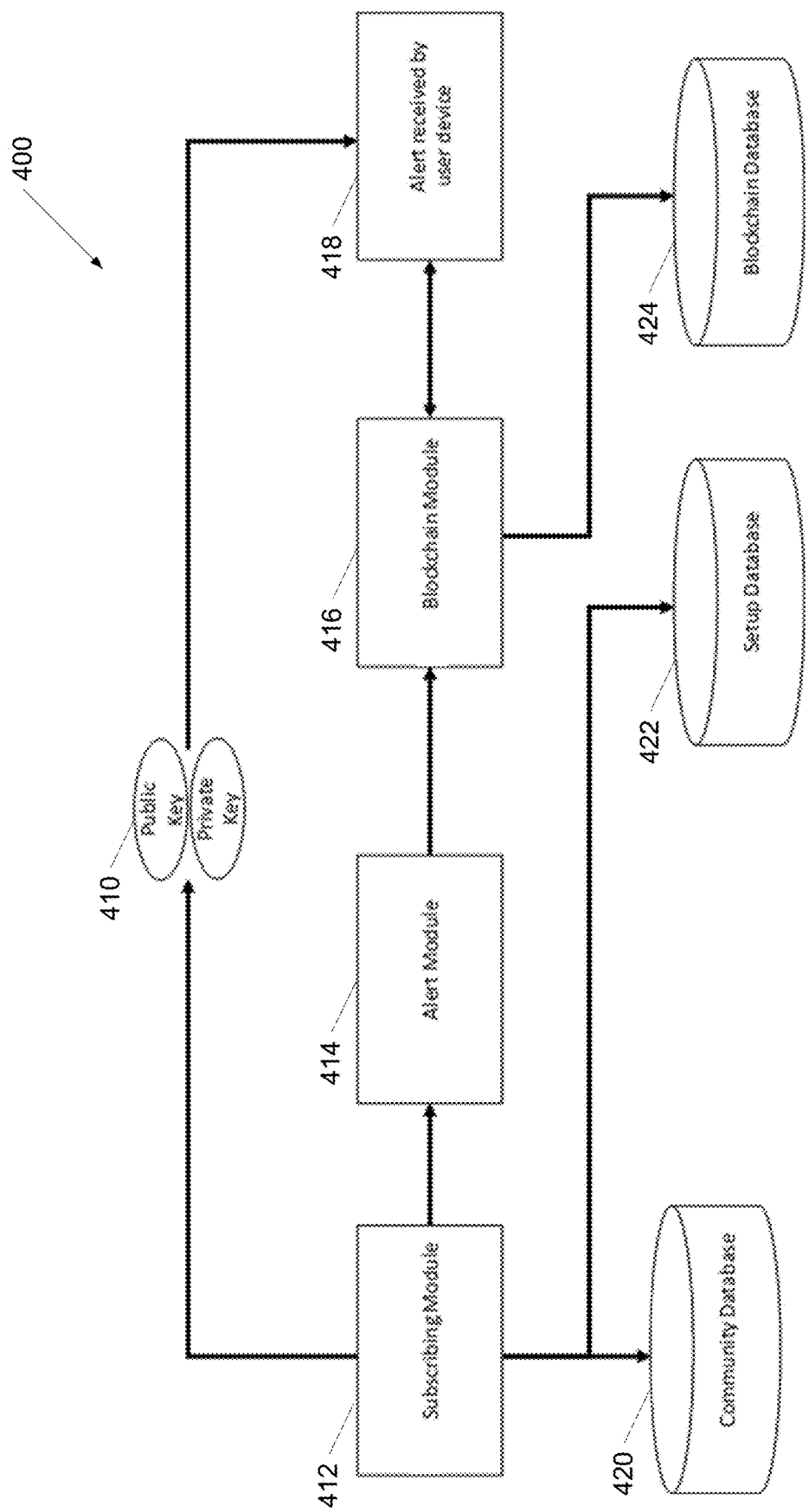
FIG. 4 is a conceptual illustration of an emergency alert system having a blockchain database in accordance with one or more aspects of the disclosure.

FIG. 4 is a conceptual illustration of an emergency alert system having a blockchain database in accordance with one or more aspects of the disclosure. The emergency alert system 400 includes an emergency alert server system having a subscribing module 412, an alert module 414, and/or a blockchain module 416. The emergency alert server system can also store (or be in communication with) a community database 420, a setup database 422, and/or a blockchain database 424. The setup database 422 can store public key information for all the different registered communities. In a variety of embodiments, user private keys are stored on the setup database and/or in the community database 420. The community database 420 can store data for all subscribers of various communities including, but not limited to, user data, information about the user's mobile device, user's private key, subscription information for accessing and receiving blockchain alerts, and the like. The stored data may include but not limited to, type of mobile device, user information, type of mobile device, the community or specific group or building the user is associated with, the current location of the mobile device, etc. Additionally, the community database could store the last know alert-receiving state of the mobile device and/or user preferences related to how and when users would like alerts delivered. The setup database 422 can store different communities that users are subscribed to and the associated public keys for blockchain alerts to allow subscribed community members to receive the alerts. The subscribing module 412 can monitor for mobile devices that enter into a geographic area and automatically provide subscribe requests to the mobile device. The subscribing module 412 can obtain subscription information from the mobile devices and store the data in the community database 420. In several embodiments, the subscribing module generates a public/private key pair 410 for the mobile device. The public/private key pair 410 can be stored using the community database 420. The alert module 414 can monitor a variety of sensors located in particular geographic areas (such as buildings, towns, borders, and the like) for sensor data indicating an alert condition, such as a fire detected. When an alert condition is detected, the emergency alert server system can generate and transmit the appropriate alert(s) to one or more mobile devices as indicated in the alert conditions stored in the alert database. The alerts can be encrypted using the public/private key pair 410 as described herein.

The emergency alert server system includes a blockchain module 416 that can be used to send out alerts to users in the communities and/or writing the alert into a blockchain transaction for storing in a blockchain ledger stored in blockchain database 424. The blockchain database 424 can include any sort of database system (e.g. relational databases, map-reduce databases, NoSQL databases, and the like) and can be a distributed database maintained using one or more computing nodes of a distributed network system. The blockchain module 416 can monitor for the delivery 418 of an alert and generate a blockchain transaction indicating the alert and/or the target mobile devices. The blockchain transaction can also include a variety of information about that alert such as, but not limited to, timing, content, alert condition, and the like. The blockchain module 416 can record the blockchain transaction using the blockchain ledger stored using the blockchain database 424. In many embodiments, the blockchain module 416 and/or blockchain database 424 can be used to transmit 418 alerts to the mobile devices. When a user response is received to an alert, the blockchain module 416 can generate a blockchain transaction indicating the response to the alert. This blockchain transaction can be recorded on the blockchain ledger to create an immutable audit trail of the alerts delivered by via the emergency alert system and the responses to those alerts.

FIG. 5 depicts a community database according to one or more aspects of the disclosure. The database 500 contains user subscription information including, but not limited to, user personal information, information regarding the user's mobile device, and information regarding access to one or more blockchain ledgers. The user personal information can include, but is not limited to, user name, login information, and/or communities to which the user is subscribed. The mobile device information can include the current alert state of the mobile device, the type of device, and/or the device location.

The community database also stores information for accessing a blockchain ledger and/or encrypting communications within an emergency alert system. For example, a private key can be associated with the user. Similarly, communities may be associated with a public key that is stored using the community database. The private key can be used to sign and/or encrypt data provided by the user. A public key associated with the user can be used to decrypt the data provided by the user. Similarly, the community public key can be used to decrypt data associated with the community that has been encrypted using a private key associated with the community. That is, a public key/private key pair can be used to encrypt and decrypt data. In this way, information originating from the user and information indicated as being related to a community can be validated for authenticity (that is, the information was actually generated by the party represented as generating the data) to secure communications within the emergency alert system. Further, the public key can be used to encrypt data that can only be decrypted using the corresponding private key, such that secure communications can be sent back to an originating party. For example, a mobile device can encrypt a response using a community public key and the emergency alert server system can decrypt the response using the community private key corresponding to the community public key.

Figure 6:
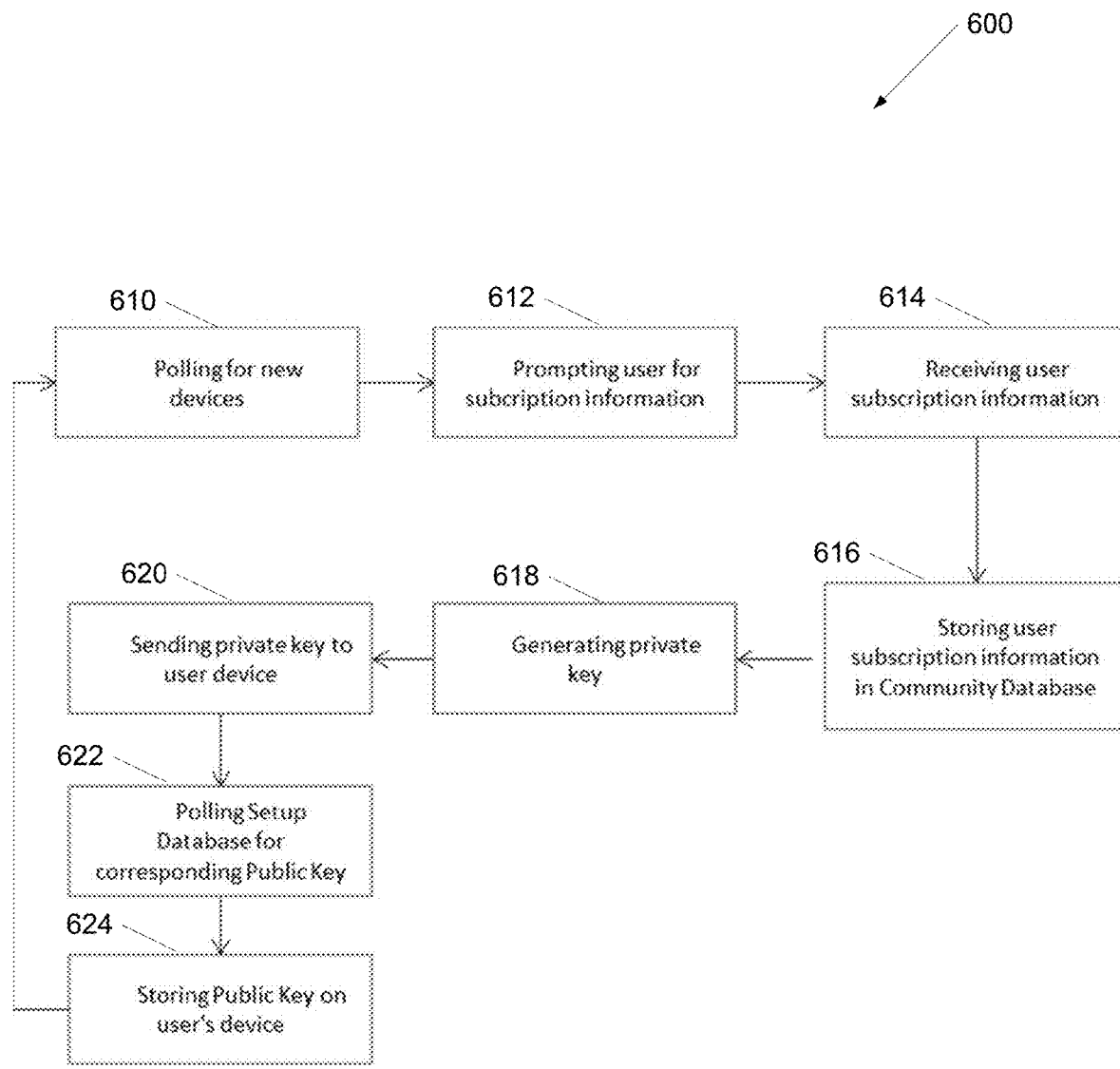
FIG. 6 depicts a flow chart for subscribing devices according to one or more aspects of the disclosure.

FIG. 6 depicts a flow chart for subscribing to alerts according to one or more aspects of the disclosure. Some or all of the steps of process 600 may be performed using any of the computing devices and/or combination thereof described herein. In a variety of embodiments, some or all of the steps described below may be combined and/or divided into sub-steps as appropriate.

At step 610, the emergency alert server system can determine if one or more mobile devices have entered a geographic region associated with a community. The emergency alert server system can determine if the mobile device is associated with the community. If the mobile device is associated with the community, the emergency alert server system can update the location of the mobile device as appropriate. If the mobile device is not part of the community, the emergency alert server system can prompt the mobile device to join the community. At step 612, once a new mobile device is detected, the emergency alert server system can send a request to the mobile device to subscribe to the community. The subscription request can include a prompt for some or all of the data stored in the community database along with one or more questions for the user.

At step 614, the emergency alert server system can obtain a response to the request from the mobile device. At step 616, the emergency alert server system can parse the received response and store the data in the community database. At step 618, the emergency alert server system can generate a security key for the mobile device. The security key can include a symmetric encryption key (e.g. a security key that can be used to both encode and decode data), a public/private key pair, an elliptical curve key, and/or any other security key as appropriate to the requirements of specific embodiments of the invention. At step 620, the generated security key can be transmitted to the mobile device. In several embodiments, only a private key and/or a public key are transmitted to the mobile device. At step 622, the emergency alert server system can transmit a public key for the community to the mobile device, which can be stored by the mobile device at step 624. The public key can allow the mobile device to decrypt alerts provided by the emergency alert server system. Different public keys can be provided to different mobile devices to control the amount of information that is provided to a particular mobile device. For example, the amount of detail in an alert can be controlled based on the role of the associated user within the community. In some organizations or communities, particular users may have privileges to see more information than other users. In many embodiments, an alert may need to be sent to a second community, and users of the second community may need some, but not all, of the information provided to a first community. For example, if there was mass casualty event at a school having a community of school administrators, secondary communities such as police officers, fire departments, and/or hospitals may also need to be alerted of the event. The school administrator community can be alerted of the mass casualty at the school and be provided the number of students at the school, while the police community can receive a notification of the mass casualty. In this way, a single alert can be sent to multiple devices and different notifications can be displayed by the mobile devices based on the ability of the mobile device to decrypt some or all of the received alert.

Figure 7:
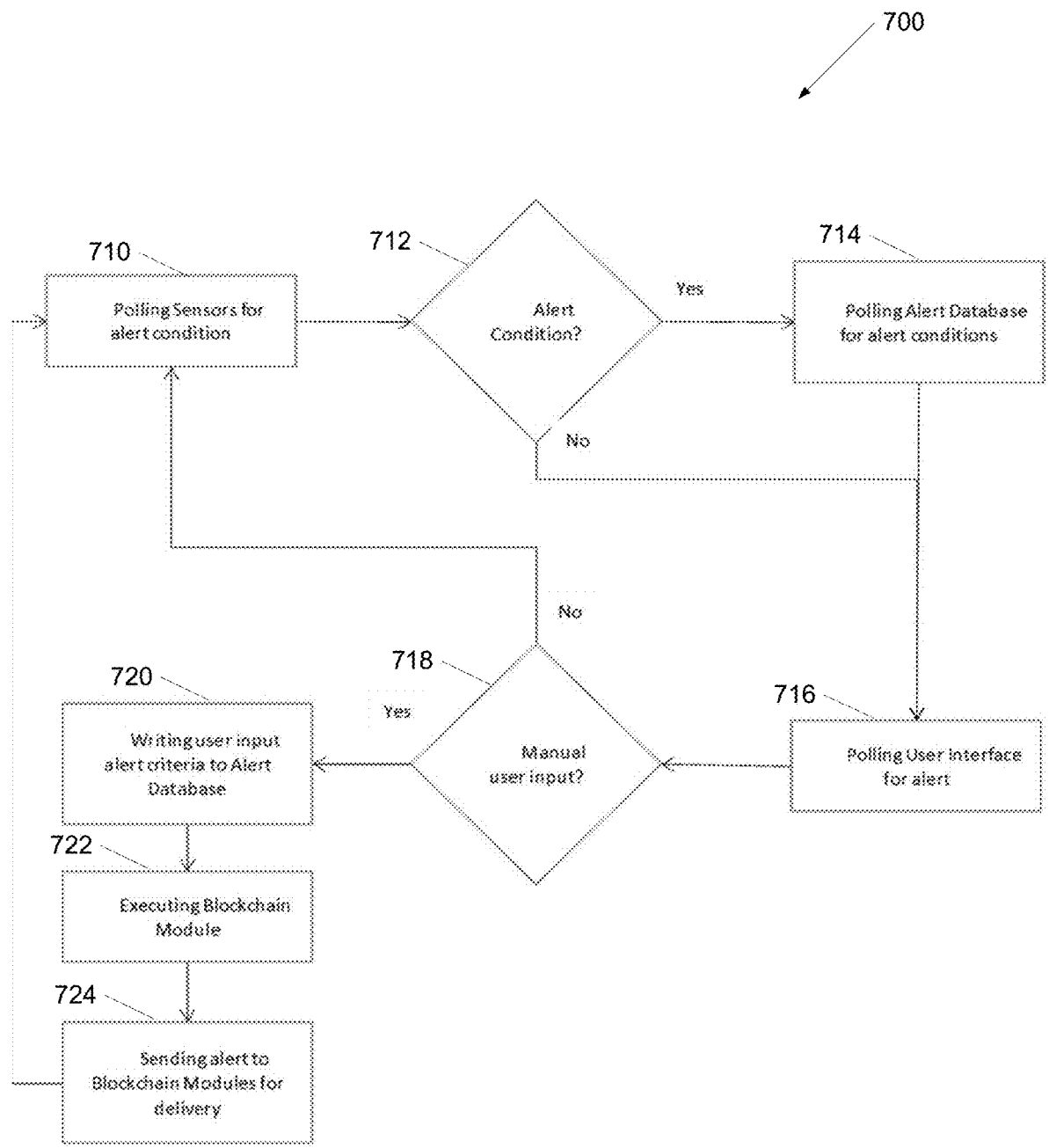
FIG. 7 depicts a flow chart for sending alerts according to one or more aspects of the disclosure.

FIG. 7 depicts a flow chart for providing alerts according to one or more aspects of the disclosure. Some or all of the steps of process 700 may be performed using any of the computing devices and/or combination thereof described herein. In a variety of embodiments, some or all of the steps described below may be combined and/or divided into sub-steps as appropriate.

At step 710, an emergency alert server system can obtain sensor data from one or more sensors. The sensors can include, but are not limited to, a variety of devices capable of detecting an alert condition such as fire alarms, smoke detectors, water sensors, occupancy sensors, equipment monitoring sensors, and the like. The sensors can be associated with a specific geographic location and/or location within a building as appropriate. At step 712, the emergency alert server system can determine if an alert condition is present based upon the sensor data. The sensor data can indicate one or more alert conditions at one or more severity levels. For example, a small amount of smoke coming from one window in the background of a photo may be indicative of a fire, but could also indicate dinner being burned on the kitchen stove. If alert conditions are present in the sensor data, the process proceeds to step 714. If the sensor data does not indicate an alert condition, the process can proceed to step 716. At step 716, the emergency alert server system can query an alert database to determine one or more alerts associated with the alert condition. The alert database can also indicate one or more communities and/or mobile devices associated with the geographic location in which the alert condition exists.

At step 716, the emergency alert server system can obtain user-provided alert conditions from one or more mobile devices. The mobile devices can be located within a threshold distance from the location indicated in the sensor data and/or indicated in the alert database. The user-provided alert condition can indicate a suspicious and/or dangerous condition along with a location at which the condition was observed. For example, the emergency alert server system can utilize a variety of image processing techniques, such as object detection and/or pattern matching, on photos uploaded to social media to identify fire or smoke in the background of an image. Additionally, the emergency alert server system can use a variety of audio processing techniques to identify features within audio data provided by a mobile device, such as detecting a gunshot captured using the microphone of a mobile device. This sensor data could come from the user's mobile devices or from infrastructure such as surveillance cameras as appropriate. The user-provided alert conditions can provide additional context to the alert conditions potentially indicated in the sensor data. For example, the user-provided alert condition can be used to determine the severity of an event so an appropriate set of alerts can be generated and transmitted to the appropriate communities and/or alert groups as described herein. At step 718, if a user-provided alert is obtained, the emergency alert server system can store the user-provided alert in an alert database at step 720. If a user-provided alert condition has not been provided at step 718, the process can return to step 710.

At step 722, the emergency alert server system can generate a blockchain transaction indicating the alert condition and/or any user-provided alert conditions if provided. The blockchain transaction can also include a set of mobile devices to which the alert is to be transmitted and one or more notifications to be displayed by the mobile device. At step 724, the emergency alert server system can transmit the blockchain transaction to a distributed network system. The distributed network system can store the blockchain transaction using a blockchain ledger and/or provide alerts to the indicated mobile devices as described herein. In many embodiments, the emergency alert server system transmits the alerts indicated in the blockchain transaction to the indicated mobile devices.

Figure 8:
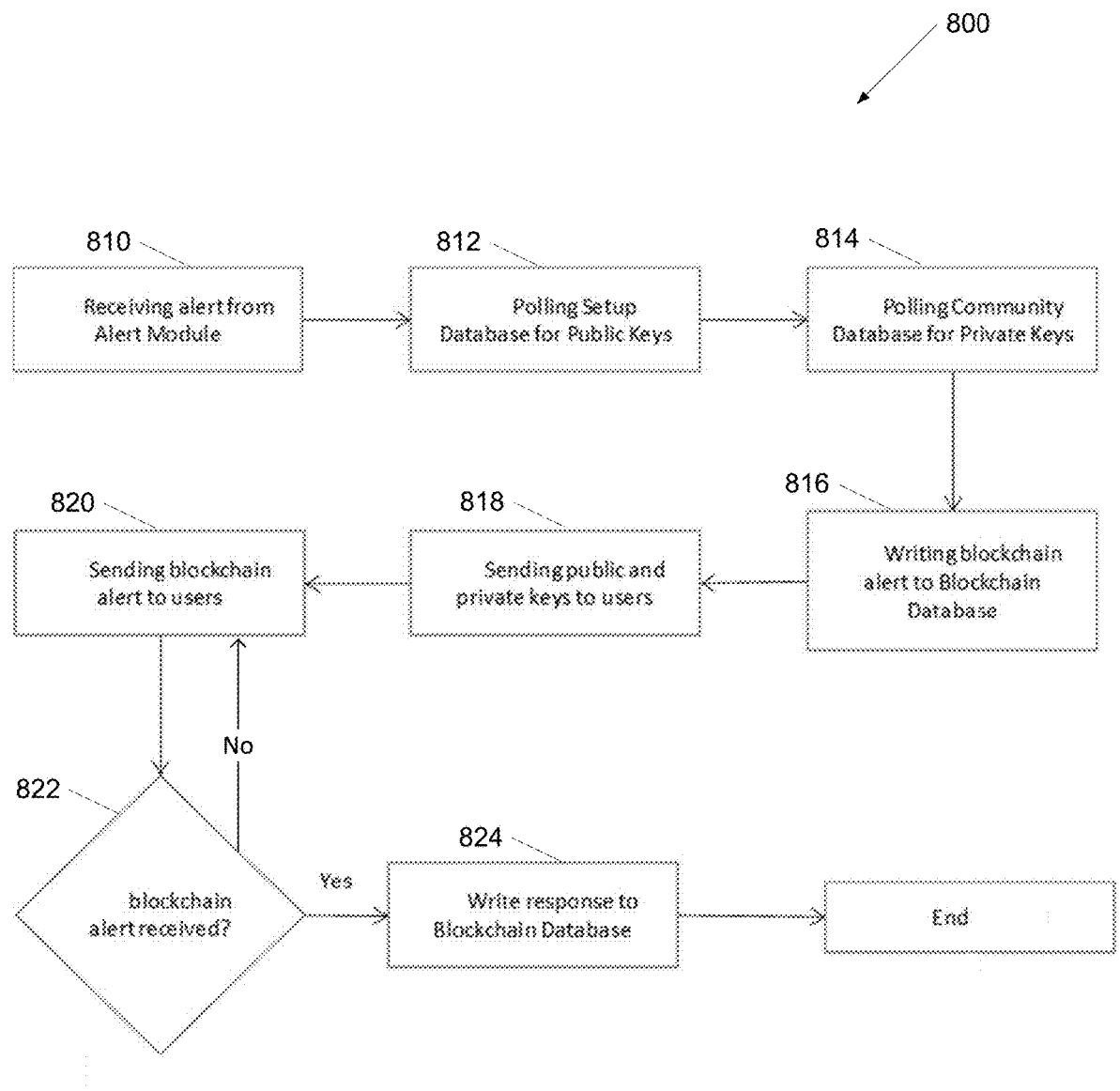
FIG. 8 depicts a flow chart for storing alerts using a blockchain according to one or more aspects of the disclosure.

FIG. 8 depicts a flow chart for storing alerts using a blockchain according to one or more aspects of the disclosure. Some or all of the steps of process 1900 may be performed using any of the computing devices and/or combination thereof described herein. In a variety of embodiments, some or all of the steps described below may be combined and/or divided into sub-steps as appropriate.

At step 810, an emergency alert server system can obtain an alert generated based on sensor data and/or user-provided alerts as described herein. The alert can include information such as, but not limited to, the communities that received the alert, which users are to receive the alert within each of the communities, and the like. For example, if there is an active shooting going on at a community, all users of community can be alerted regardless of their location. Furthermore, secondary communities such as the police and hospital can also be notified. The alert transmitted to the secondary communities may not go to all users (e.g. all police officers), but only those that distribute information and coordinate responses to shootings. Additionally, the police users may only view the information the public key allows.

At step 812, the emergency alert server system can query a setup database to determine the appropriate public keys required for each community identified in the alert. In a variety of embodiments, the public key could be stored with the user's information in a community database. At step 814, the emergency alert server system can query a community database for the private keys associated with the mobile devices and/or communities indicated in the alert. At step 816, the emergency alert server system can generate a blockchain transaction based on the alert and store the blockchain transaction on a blockchain ledger stored using a blockchain database. In many embodiments, the blockchain transaction includes one or more versions of the alert encrypted using the public key of each mobile device and/or the private key of the communities. At step 818, the emergency alert server system can transmit public and/or private keys to the mobile devices. The public key can allow users to see general information such as what the alert is. The private key can allow users to respond, thereby notifying the system that the user received the alert. The response can be recorded on the blockchain ledger using a second blockchain transaction indicating the response. Furthermore, the private key may allow users to see additional information within the blockchain depending on the user's role in the community. At step 820, the emergency alert server system can transmit the alert. The alert can be transmitted directly by the emergency alert server system and/or by a distributed network system. The alert can be transmitted to the identified mobile devices.

At step 822, the emergency alert server system can obtain a receipt indicating that the alert was delivered to the mobile devices. In many embodiments, the receipt is generated by the mobile device and automatically transmitted when the mobile device uses the public key and/or private key to decrypt the received alert. In several embodiments, if the emergency alert server system does not receive a receipt from a particular mobile device, the emergency alert server system can cause the alert to be retransmitted to the mobile device. The emergency alert server system can continually send alert until it receives a reply and/or it can cease retransmission after a predetermined set of tries. At step 824, the emergency alert server system can generate a blockchain transaction indicating the received response. The blockchain transaction can be recorded on the blockchain ledger as described herein.

Figure 9:
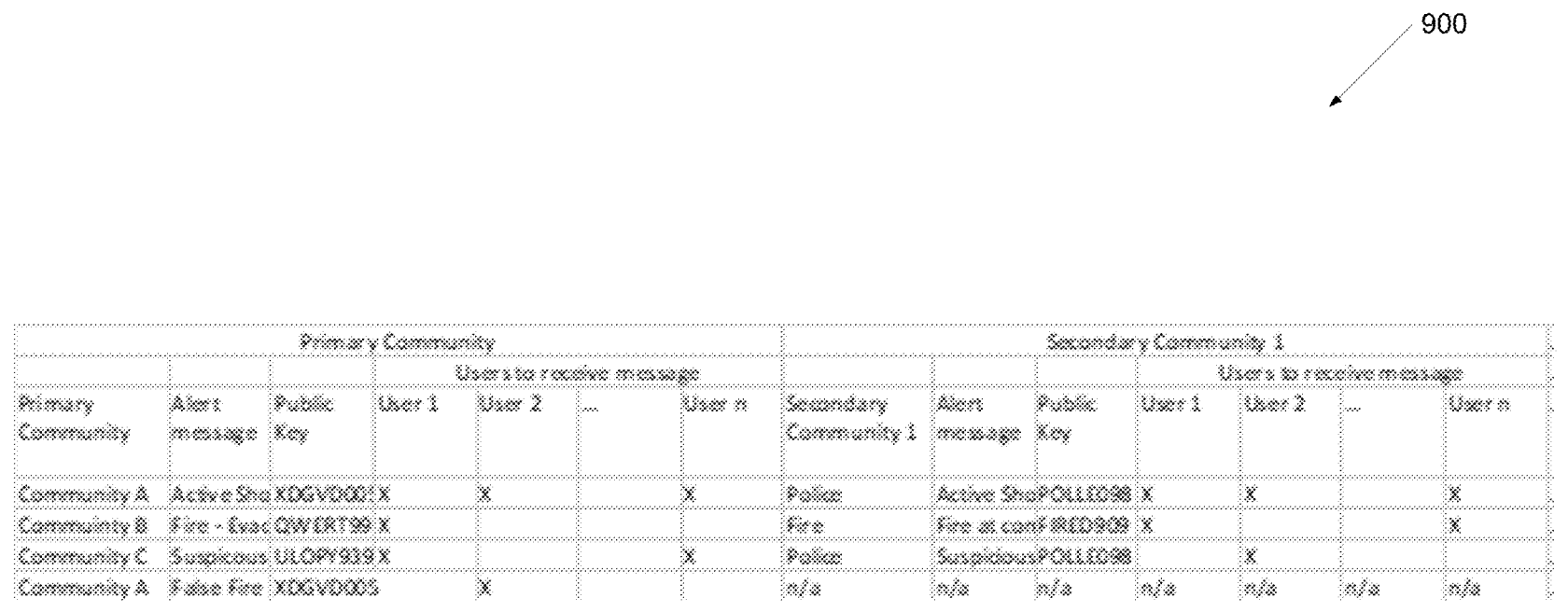

FIG. 9 depicts an alert database according to one or more aspects of the disclosure. The alert database (and/or blockchain database) 900 contains data that is a part of each blockchain alert such as the type of alert, the alert message, the primary community and its members the alert is going to, the alert text, public key for the community, a least one secondary community, the alert message for the secondary community, the public key for the secondary community, and the users in the secondary community. A secondary community can be any community that would benefit or would naturally be alert along with the primary community is alerted in certain situations. For example, if there is an active shooting happening at the primary community location, e.g. a school, the police, fire or EMS, and the hospital may be alerted as well. The secondary community may be preprogrammed base on the type of alert or emergency and/or added to the alert database when the alert is created.

FIG. 10 depicts setup database according to one or more aspects of the disclosure. The database 1000 contains data for all the different communities that are registered on the communication system in the community database along with the public key for each of the communities that allow users to see the general data of an alert.

An emergency alert server system can monitor for the delivery of alerts to mobile devices. The emergency alert server system can further query and/or monitor for activity on the mobile device indicating that the alert has been viewed. In many embodiments, the emergency alert server system begins monitoring for the viewing of an alert after a threshold time. In several embodiments, the mobile device provides a confirmation to the emergency alert server system when the mobile device obtains input data related to the provided alert. The mobile device can capture a variety of sensor data, such as lock status, location movement (via a location determination device such as a Global Positioning System (GPS) receiver), movement of the mobile devices (e.g. movement as determined by an accelerometer and/or gyroscope), and the like. The emergency alert server system can obtain the sensor data from the mobile device and determine a probabilistic likelihood that the user has viewed the mobile device. If the user does not interact with the alert sent to their mobile device, the emergency alert server system can transmit the alert to other devices registered to the user within the proximity of the mobile device. If there is still no reply from the user, the emergency alert server system can transmit a message or alert to second user indicating that the second user may want to check on the first user.

A device database may contain a list of other devices that are registered or used by a particular subscriber to a community. Other devices that may be registered to a user may include wearables (e.g. smart watches and the like), computer, tablets, desk phones, etc. The wearable or other devices can connect to a mobile device, such as via Bluetooth or any other short-range communication system, which can indicate that the user is near the mobile device. The emergency alert server system can determine the current location of a mobile device and compare the current location to the last known historical location of the mobile device. Based on this, the emergency alert server system can determine if the mobile device has moved within a set amount of time and/or if the device is currently moving. The emergency alert server system can determine when a user has their mobile device with them and/or the mobile device is within a threshold proximity of the user after an alert has been sent and if the user has interacted with the alert based on the movement of the mobile device. An emergency alert application executing on the mobile device can determine if a user has interacted with the mobile device by monitoring for the locked or unlocked status of the mobile device to change. For example, if the location of the mobile device has not changed since the alert was sent to the mobile device, the user may be using the mobile device as, for example, the user can be sitting at their desk. By monitoring for changes in the lock status of the mobile device, an emergency alert server system can determine if the mobile device is being used even when the device is not moving. In several embodiments, the emergency alert server system determines if the mobile device has been used within a threshold period of time and sends the alert to the mobile device when the mobile device is being used.

The emergency alert server system can determine if devices associated with other users are proximate to the mobile device. When the emergency alert server system determines that a first user has not interacted with an alert within a threshold period of time, the emergency alert server system can transmit an alert to one or more devices associated with the other user(s). The emergency alert server system can also determine if a particular action has been performed by the user's mobile device and send an alert to the other devices. For example, if the user's mobile device indicates that the user has fallen, a notification can be transmitted to the mobile device associated with the user's caregiver to alert the caregiver that the user may have fallen or had an accident.

Figure 11:
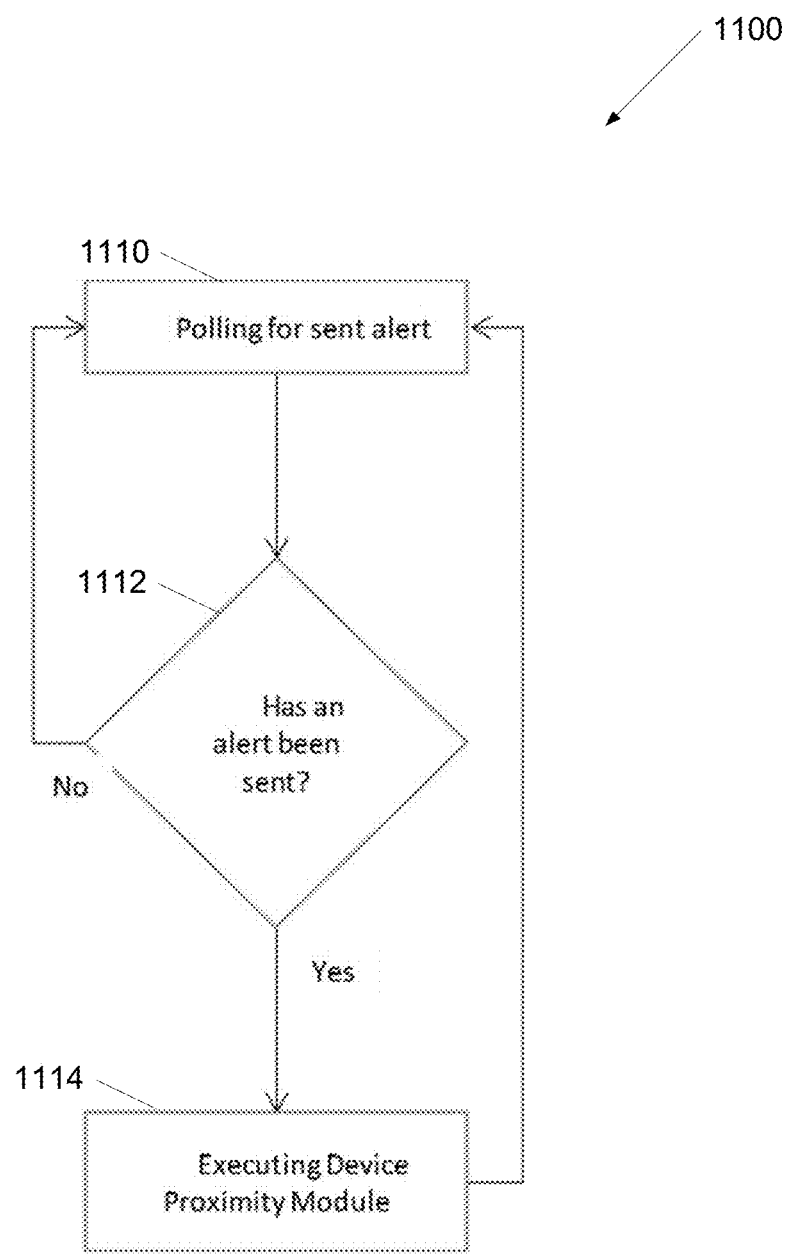
FIG. 11 depicts a flow chart for providing alerts according to one or more aspects of the disclosure.

FIG. 11 depicts a flow chart for providing alerts according to one or more aspects of the disclosure. Some or all of the steps of process 1100 may be performed using any of the computing devices and/or combination thereof described herein. In a variety of embodiments, some or all of the steps described below may be combined and/or divided into sub-steps as appropriate.

At step 1110, an emergency alert server system can determine if an alert has been sent to a mobile device. At step 1112, if an alert has been sent, the emergency alert server system can determine if the mobile device has been used at step 1114. For example, the emergency alert server system can determine if the mobile device has moved and/or has been locked or unlocked as described herein. In several embodiments, the emergency alert server system can determine if the mobile device has been viewed by receiving a response from the mobile device.

Figure 12:
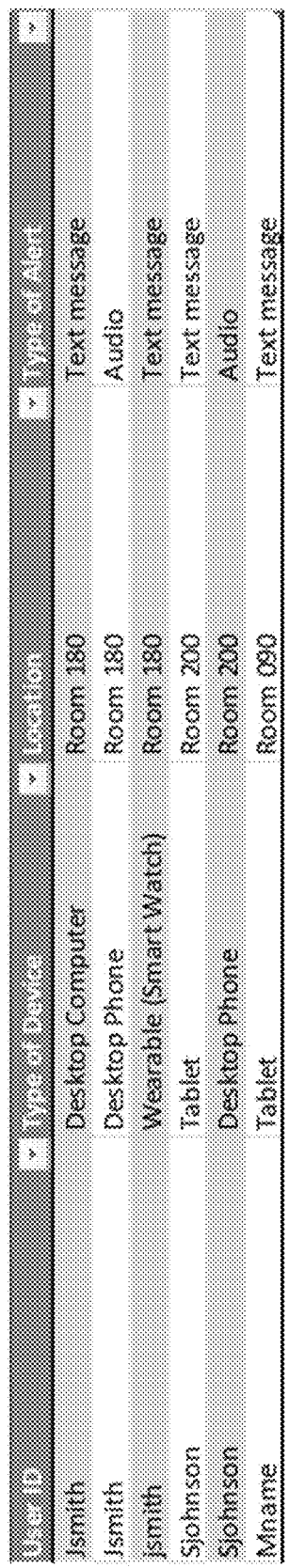
FIG. 12 depicts an other devices database according to one or more aspects of the disclosure.

FIG. 12 depicts an other devices database according to one or more aspects of the disclosure. The other devices database 1200 contains a list of other devices that are registered to a user along with the last known location of the device. These devices may include wearables, tablets, computers deck phones, and the like. The location of the device can be determined directly, such as via GPS, and/or a proxy location can be inferred from an interaction by the device with another device having a known location. In several embodiments, the devices have a fixed location that is known and stored in the database. For example, a device can include a desk phone that is associated with a user. A desk phone typically has a fixed location such that, for example, the location of the desk phone can be known to be the user's office.

Figure 13:
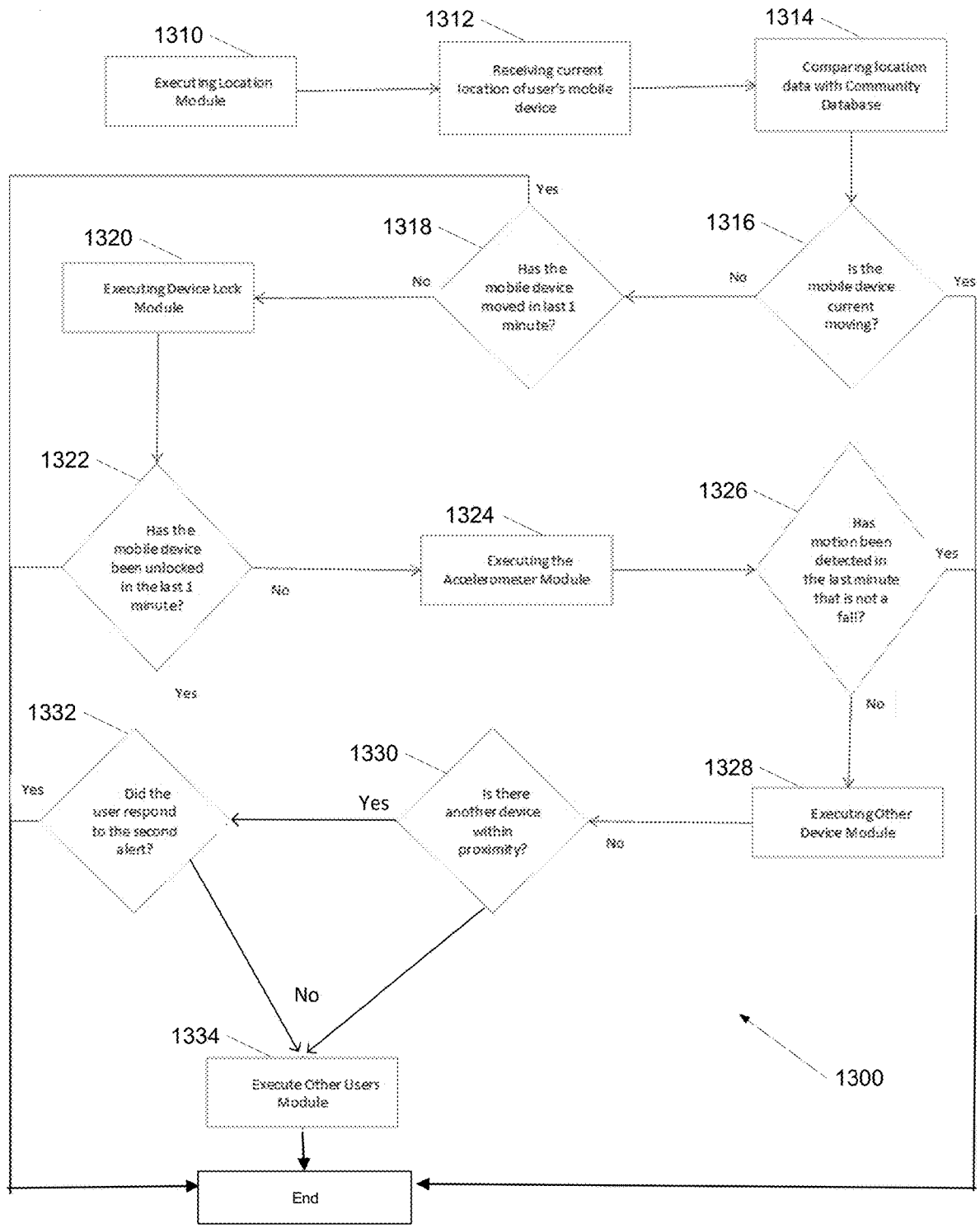
FIG. 13 depicts a flow chart for determining that a mobile device has received an alert according to one or more aspects of the disclosure.

FIG. 13 depicts a flow chart for determining that a mobile device has received an alert according to one or more aspects of the disclosure. Some or all of the steps of process 1300 may be performed using any of the computing devices and/or combination thereof described herein. In a variety of embodiments, some or all of the steps described below may be combined and/or divided into sub-steps as appropriate.

At step 1310, an emergency alert server system can request the location of a user's mobile device. At step 1312, the emergency alert server system can obtain the current location of the mobile device. At step 1314, the emergency alert server system can compare the current location of the mobile device to the last known location of the mobile device. The last known location of the mobile device can be stored using a community database. At step 1316, the emergency alert server system can determine if the mobile device is currently moving. If the mobile device is currently moving, it can be determined that the user associated with the mobile device has viewed the alert and the process can end. If the mobile device is not currently moving, the emergency alert server system can determine if the location of the mobile device has changed in a threshold period of time from the alert being transmitted to the mobile device, such as one minute, at step 1318. It should be noted that any threshold period can be used in accordance with embodiments of the invention. If the mobile device has moved within the threshold period, it can be determined that the user associated with the mobile device has seen the alert and the process can end.

If it is determined that the mobile device has not moved within the threshold period of time, the process can proceed to step 1320. At step 1320, the emergency alert server system can determine if the mobile device has been locked or unlocked. In many embodiments, an emergency alert application executing on the mobile device can determine the current lock status of the mobile device and/or when the lock status of the mobile device changes. The emergency alert server system can obtain the lock status and/or change in lock status from the emergency alert application executing on the mobile device. At step 1322, if the mobile device has been locked or unlocked within the threshold period of time, it can be determined that the user has viewed the alert and the process can end.

If the mobile device has not been locked or unlocked at step 1322, the process can proceed to step 1324. At step 1324, the emergency alert server system can determine if the mobile device has moved. The emergency alert application executing on the mobile device can obtain sensor data from a variety of sensors including, but not limited to, GPS receivers, accelerometers, and/or gyroscopes, to determine if the mobile device has moved and when the mobile device has moved. The emergency alert server system can obtain the device movement data from the emergency alert application and/or from the mobile device directly. At step 1326, if the mobile device has moved within the threshold period of time, it can be determined that the user has viewed the alert and the process can end.

If the mobile device has not moved at step 1326, the process can proceed to step 1328. At step 1328, the emergency alert server system can determine if there are other devices (e.g. secondary devices) associated with the mobile device. In a variety of embodiments, the emergency alert server system queries an other device database to identify other devices associated with to the mobile device. The other devices can be in proximity to the user and/or the mobile device. If there is not a secondary device proximate to the user, the process can proceed to step 1334. If there is a secondary device in proximity to the user at step 1330, a second alert can be provided to the secondary device(s). For example, if there is a desktop phone near the user's mobile device, the desktop phone may be dialed to play an audible alert. At step 1332, it can be determined if the user interacted with the secondary alert. For example, if the secondary alert is provided to the user's desktop phone, the emergency alert server system can determine the user received the secondary alert if the user's desktop phone was answered. If the user interacted with the secondary alert at step 1332, the process can end. If the user does not interact with the secondary alert, the process can proceed to step 1334.

At step 1334, the emergency alert server system can determine if there are other users within a proximate distance of the mobile device. The emergency alert server system can generate an alert targeted toward the other users and provide the alert to the other user(s) as described herein. This alert can indicate to the other users that the user may be in need of assistance and/or direct the other user to the last known location of the user.

Figure 14:
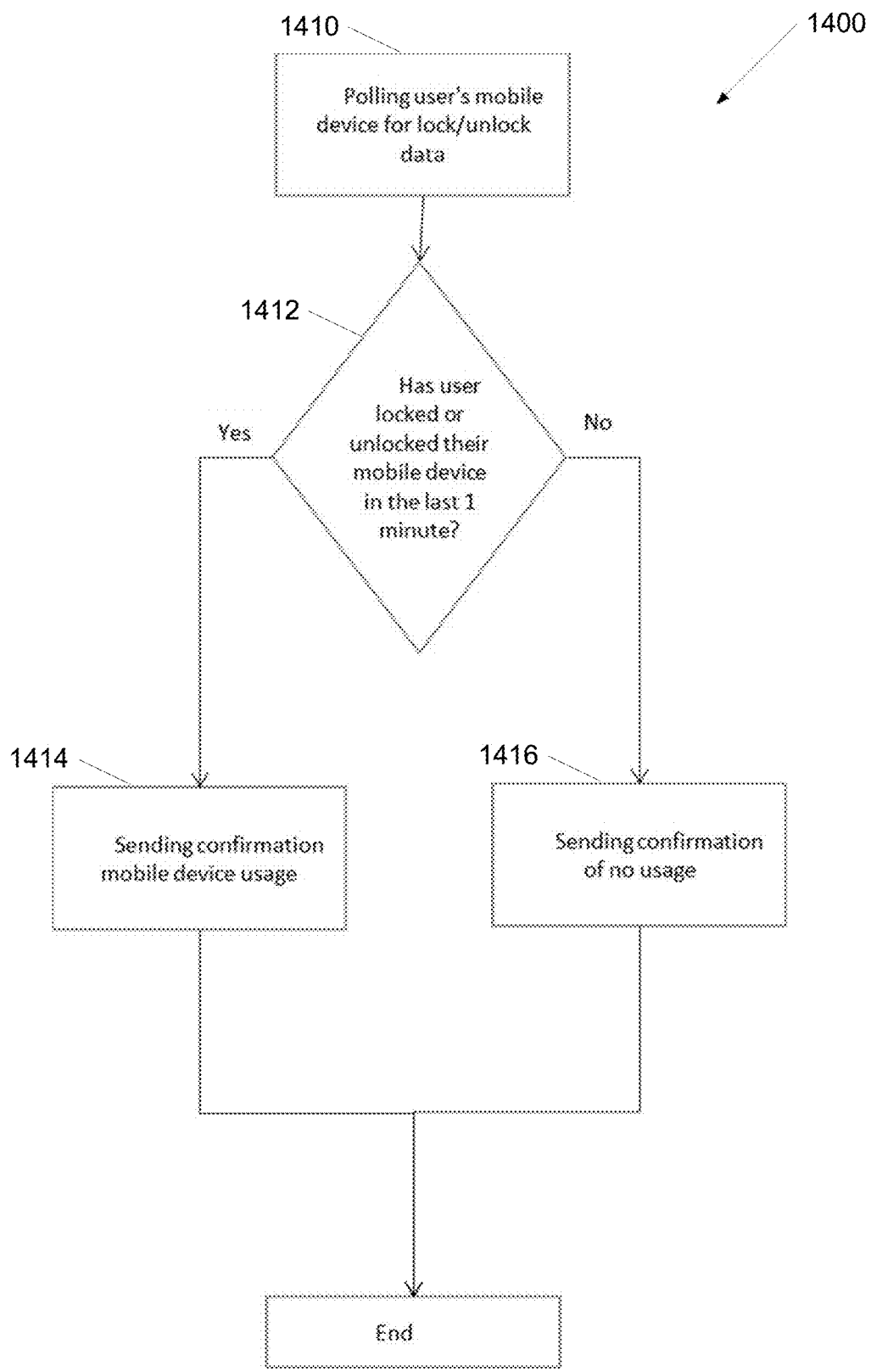
FIG. 14 depicts a flow chart for determining if a mobile device is in use according to one or more aspects of the disclosure.

FIG. 14 depicts a flow chart for determining if a mobile device is in use according to one or more aspects of the disclosure. Some or all of the steps of process 1400 may be performed using any of the computing devices and/or combination thereof described herein. In a variety of embodiments, some or all of the steps described below may be combined and/or divided into sub-steps as appropriate.

At step 1410, an emergency alert application executing on a mobile device can determine if the mobile device has been locked or unlocked as described herein. At step 1412, the emergency alert application can determine if the mobile device has had its lock status changed within a threshold period of time, such as one minute. However, any threshold period can be used as appropriate. If the mobile device has been locked or unlocked within threshold period of time at step 1412, it can be determined that the user is near their mobile device and received the alert message and the process can proceed to step 1414. If the mobile device has not been locked or unlocked within the threshold period of time, the process can proceed to step 1416. At step 1414, the emergency alert application can transmit a message to an emergency alert server system indicating that the mobile device is in use.

Figure 15:
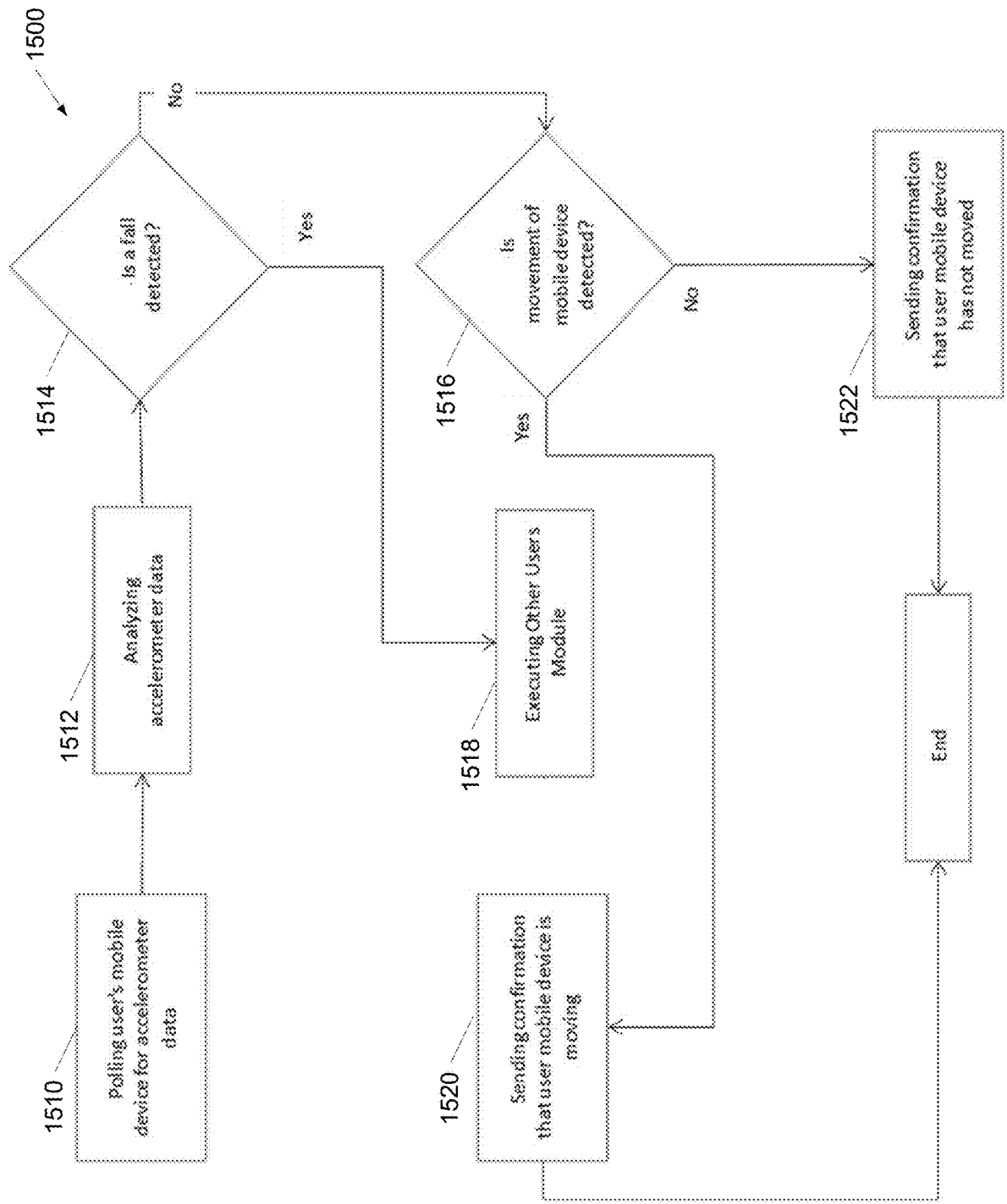
FIG. 15 depicts a flow chart for determining if a mobile device is in use according to one or more aspects of the disclosure.

FIG. 15 depicts a flow chart for determining if a mobile device is in use according to one or more aspects of the disclosure. Some or all of the steps of process 1500 may be performed using any of the computing devices and/or combination thereof described herein. In a variety of embodiments, some or all of the steps described below may be combined and/or divided into sub-steps as appropriate.

At step 1510, an emergency alert application executing on a mobile device can obtain sensor data from one or more sensors in the mobile device. The sensors can include, but are not limited to, GPS receivers, accelerometers, gyroscopes, and the like. The sensor data can indicate movement of the device, including direction of movement and magnitude of the movement in one or more directions. At step 1512, the emergency alert application can classify the movement type indicated by the sensor data. If the device has moved less than a threshold distance, the mobile device can be indicated to be moving. If the device has moved more than a threshold distance, the mobile device can be indicated as falling. It should be noted that the threshold distance can be any distance depending on the specific applications of embodiments of the invention and that other criteria, such as speed of movement and/or rate of change of movement, can also be used to determine the type of movement being experienced by the mobile device. At step 1514, it can be determined if the movement has been classified as a fall. If the mobile device is indicated as falling, the process can proceed to step 1518. If the movement has been classified as regular movement of the mobile device, the process can proceed to step 1516 to determine if the mobile device is experiencing normal movement.

At step 1516, if the mobile device is not moving, the emergency alert application can transmit a message indicating that the mobile device is not moving to a variety of devices, such as an emergency alert server system, at step 1522. If the mobile device is moving, the emergency alert application can transmit a message indicating that the mobile device is moving to a variety of devices, such as an emergency alert server system, at step 1520.

At step 1518, if a fall has been detected, the user may not have received the alert and/or is injured and may be in need of assistance. The emergency alert application can transmit a message to the emergency alert server system indicating that the user may be in need of assistance as described in more detail herein.

Figure 16:
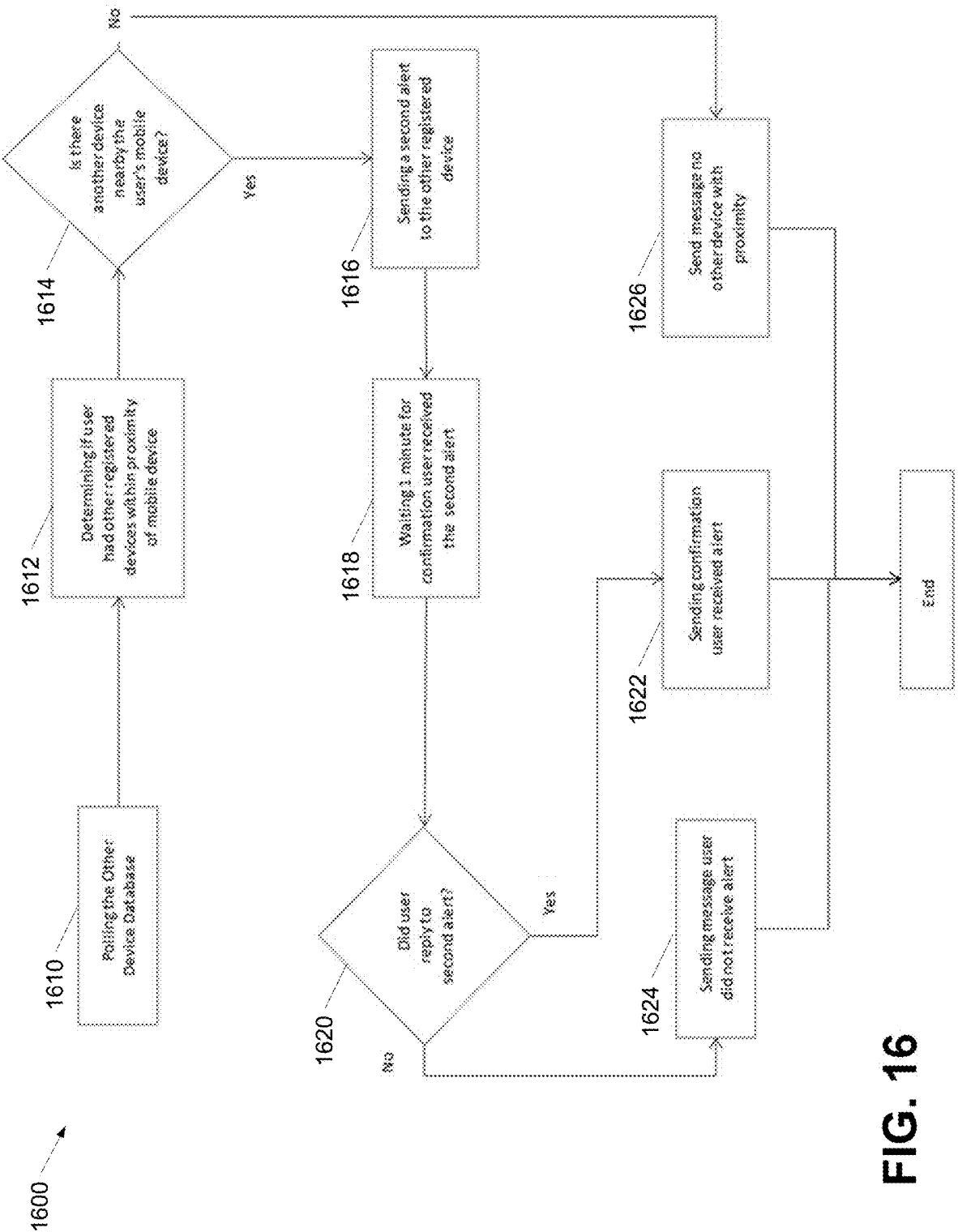
FIG. 16 depicts a flow chart for providing alerts to secondary devices according to one or more aspects of the disclosure.

FIG. 16 depicts a flow chart for providing alerts to secondary devices according to one or more aspects of the disclosure. Some or all of the steps of process 1600 may be performed using any of the computing devices and/or combination thereof described herein. In a variety of embodiments, some or all of the steps described below may be combined and/or divided into sub-steps as appropriate.

At step 1610, an emergency alert server system can identify other devices that are registered to a user associated with a mobile device and the locations of those secondary devices. Secondary devices may include computer, tablets, desktop phones, wearable devices, and the like. At step 1612, the emergency alert server system can determine if any of the secondary devices are located within a threshold distance of the mobile device. The threshold distance can be any distance as appropriate to specific applications of embodiments of the invention. The emergency alert server system can query an other devices database to determine the last known location of the mobile device and/or the secondary devices. For example, a secondary device can within ten feet of the last known location of the mobile device. At step 1614, the emergency alert server system can determine if there are any secondary devices within a threshold distance. If there are no secondary devices within a threshold distance, the emergency alert server system can generate and transmit an alert indicating that there are no secondary devices within a threshold distance of the mobile device. This alert can be sent to the mobile device and/or to a computing device associated with another user as appropriate.

If there is a secondary device within a threshold distance of the mobile device at step 1616, the emergency alert server system can transmit the alert to the secondary device(s) at step 1616. At step 1618, the emergency alert server system can wait a threshold period of time, such as one minute, for a confirmation that the alert has been viewed using the secondary device. The emergency alert server system can determine if the secondary device has been used to view the alert using any of a variety of techniques as described herein. At step 1620, if the emergency alert server system receives confirmation that the alert has been viewed by the secondary device, the emergency alert server system can generate a message indicating that the alert has been viewed. The message can be provided to a variety of computing device and/or stored using a blockchain ledger and/or database at step 1622. If the user did not interact with the alert at step 1620, the emergency alert server system can generate a message indicating that the alert has not been viewed. The message can be provided to a variety of computing device and/or stored using a blockchain ledger and/or database at step 1624.

Figure 17:
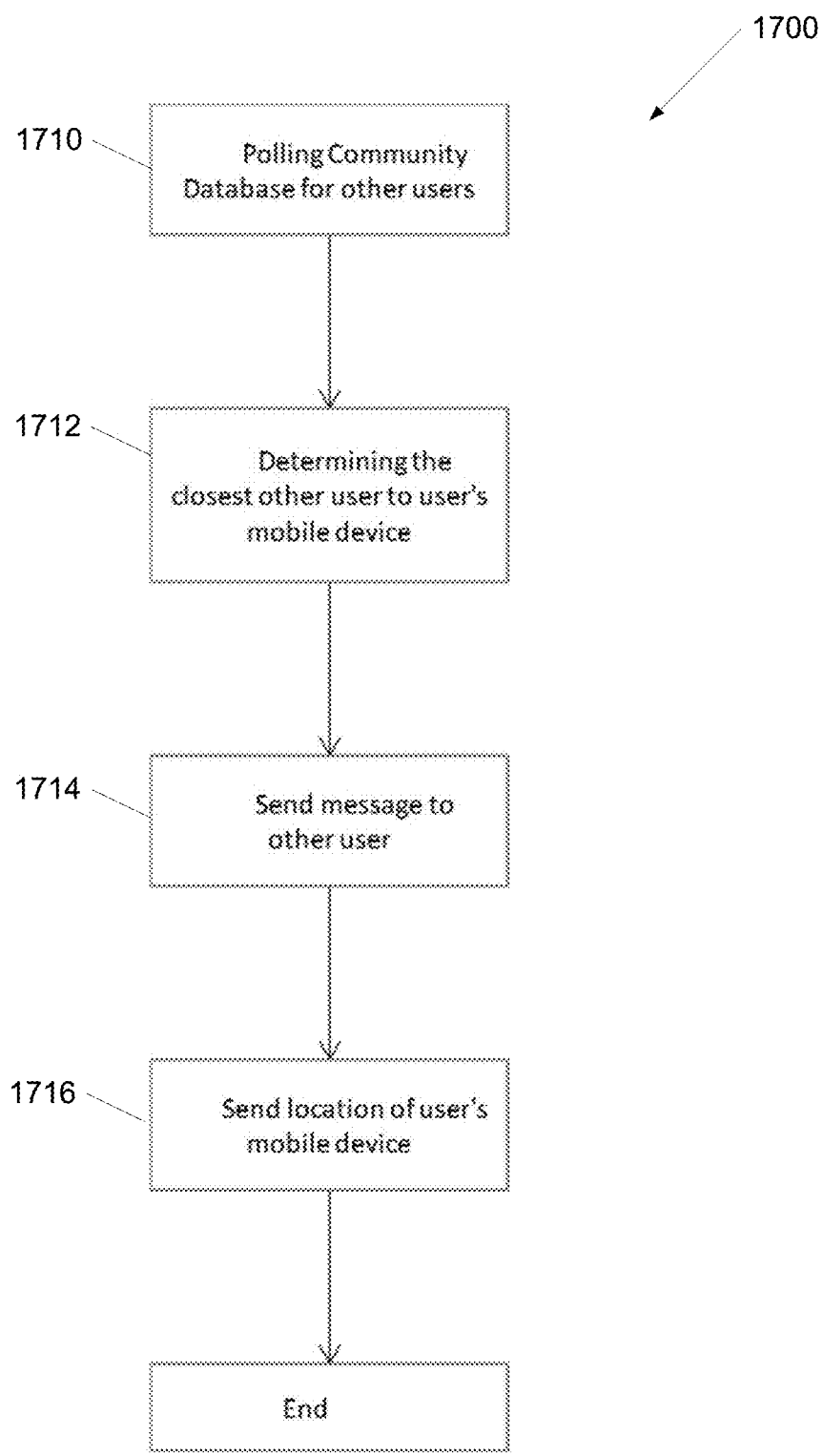
FIG. 17 depicts a flow chart for identifying other users according to one or more aspects of the disclosure.

FIG. 17 depicts a flow chart for identifying other users according to one or more aspects of the disclosure. Some or all of the steps of process 1700 may be performed using any of the computing devices and/or combination thereof described herein. In a variety of embodiments, some or all of the steps described below may be combined and/or divided into sub-steps as appropriate.

At step 1710, an emergency alert server system can determine other users associated with a mobile device. In many embodiments, the emergency alert server system queries a community database to determine other users that are located within a threshold distance of the mobile device. At step 1712, the emergency alert server system can determine a second user in the set of other users. The second user can be the user that is closest to the mobile device. However, it should be noted that any criteria, such as the user's role within a particular community, and/or random sampling can be used to determine the second user. Additionally, the second user can include multiple users. At step 1714, the emergency alert server system can generate and transmit an alert to a mobile device associated with the second user(s).

The alert can indicate that the mobile device and/or secondary devices associated with the mobile device have not interacted with an alert sent to those devices. The alert can also indicate a likelihood that the user associated with the mobile device and/or secondary devices has experienced an injury, such as a fall. The alert can prompt the second user(s) to contact the user associated with the mobile device and/or secondary devices. The alert can also include a map to help guide the second user to the first user's location. At step 1716, the emergency alert server system can transmit the last known location of the mobile device and/or secondary devices to the mobile device(s) associated with the second user(s).

The emergency alert server system can communicate with communities of users determined to be located in a particular geographic region. The alerts provided by the emergency alert server system can override any alert-inhibiting state of a mobile device to deliver audio, visual, and/or haptic notifications in emergency situations as described herein. Emergency alert server systems can alert multiple communities and/or subsets of a community based on, but not limited to, their role in the community, the alert state, and/or their geolocation. Alert states generated for one community can cause additional alerts to be generated for members of secondary communities located in such a manner that the alert conditions may affect the secondary community. For example, there may be a fire in a building and a first community (e.g. school administrators) is alerted while a second community (e.g. one or more hospitals within a threshold distance of the building) is alerted as well for the same event. Different alerts can similarly be generated for different alert groups within a community, such as different alerts being sent to an administrator group and a teacher group within a school community. If additional conditions occur, the provided alerts can be modified and/or retransmitted to the various communities. For example, a traffic jam can prevent fire trucks from reaching the building burning for 20 minutes. This second event can cause the emergency alert server system to generate updated alerts for the first and second communities that have more urgent notifications associated with them (e.g. flashing lights, a louder alarm, and/or haptic notifications instead of just an audible notification). The emergency alert server system can provide these updated alerts to the first and second communities so that the school administrators and hospitals are aware of the changed conditions so they can react accordingly. The alerts generated for and delivered to different alert groups and/or different communities can be based on the response of previously alerted groups of users and/or communities.

Figure 18:
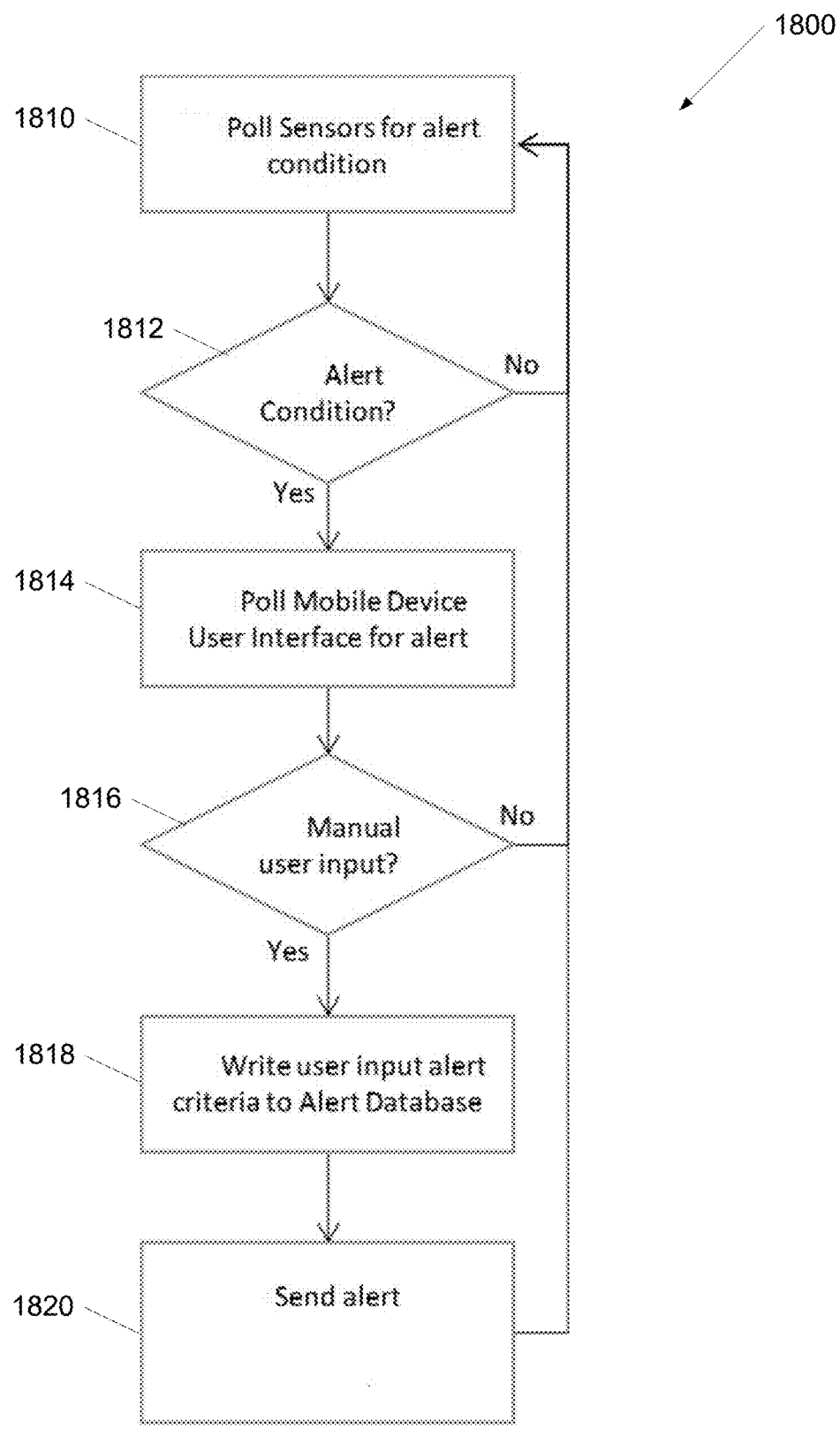
FIG. 18 depicts a flow chart for generating alerts according to one or more aspects of the disclosure.

FIG. 18 depicts a flow chart for generating alerts according to one or more aspects of the disclosure. Some or all of the steps of process 5100 may be performed using any of the computing devices and/or combination thereof described herein. In a variety of embodiments, some or all of the steps described below may be combined and/or divided into sub-steps as appropriate.

At step 1810, an emergency alert server system can obtain sensor data from one or more sensors. The sensors can include, but are not limited to, a variety of devices capable of detecting an alert condition such as fire alarms, smoke detectors, water sensors, occupancy sensors, equipment monitoring sensors, and the like. The sensors can be associated with a specific geographic location and/or location within a building as appropriate. At step 1812, the emergency alert server system can determine if an alert condition is present based upon the sensor data. The sensor data can indicate one or more alert conditions at one or more severity levels. For example, a small amount of smoke coming from one window in the background of a photo may be indicative of a fire, but could also indicate dinner being burned on the kitchen stove. If alert conditions are present in the sensor data, the process proceeds to step 1814. If the sensor data does not indicate an alert condition, the process can return to step 1810.

At step 1814, the emergency alert server system can obtain user-provided alert conditions from one or more mobile devices. The mobile devices can be located within a threshold distance from the location indicated in the sensor data. The user-provided alert condition can indicate a suspicious and/or dangerous condition along with a location at which the condition was observed. For example, the emergency alert server system can utilize a variety of image processing techniques, such as object detection and/or pattern matching, on photos uploaded to social media to identify fire or smoke in the background of an image. Additionally, the emergency alert server system can use a variety of audio processing techniques to identify features within audio data provided by a mobile device, such as detecting a gunshot captured using the microphone of a mobile device. This sensor data could come from the user's mobile devices or from infrastructure such as surveillance cameras as appropriate. The user-provided alert conditions can provide additional context to the alert conditions potentially indicated in the sensor data. For example, the user-provided alert condition can be used to determine the severity of an event so an appropriate set of alerts can be generated and transmitted to the appropriate communities and/or alert groups as described herein. At step 1816, if a user-provided alert is obtained, the emergency alert server system can store the user-provided alert in an alert database at step 1818. If a user-provided alert condition has not been provided at step 1816, the process can return to step 1810. At step 1820, the emergency alert server system can transmit the alert to the appropriate mobile devices using any of a variety of communication channels as described herein.

FIG. 19 depicts an alert routing database according to one or more aspects of the disclosure. The alert routing database 1900 contains alert information that includes the type of alert, groups to be alerted, and/or other alerting criteria for one or more alert groups for one or more communities. Each alert has a column that holds its content and distribution criteria. For example, the first column can be for a spill in a theme park. When a spill is first detected, by either an administrator who prompts the alert or through sensors that detect the condition requiring attention from facilities personnel, designated facilities staff can be identified as the primary alert group that needs to be the first notified. In several embodiments, the alert group is further refined identifying users within the alert group that are within a threshold distance (e.g. 100') around the spill. The alert sent to the first alert group can indicates a variety of notifications (e.g. a sound alert and a haptic alert) and/or a message to be displayed. Once the alert is delivered to the user(s) in the primary alert group, the emergency alert server system can determine if a secondary alert group, if any, needs to be alerted according to secondary alert criteria. In the spill example, the secondary alert criteria can indicate that the secondary alert group is always alerted. The secondary alert group can include customer-facing staff, who will receive an alert including a message to be displayed. Tertiary alert criteria can be used to identify if any tertiary (or further) alert groups may also need to be alerted. For example, tertiary alert criteria can indicate an alert group to be alerted when one or more users in the primary alert group do not respond to or interact with the alert within a threshold amount of time. For example, facilities staff that are over 100' away from the spill can be alerted when no response is received from facilities staff within 100' of the spill within five minutes.

A variety of alert criteria can be defined to send alerts to secondary alert groups, tertiary alert groups, and the like. The alert criteria can define what actions should be taken based on the type of alert and/or the actions taken by a different alert group. The alert criteria can include a variety of criteria including, but not limited to, time to respond, geographic location, distance to alert condition, community role, alert group, event type, event severity, a level request of the user that is preset to be notified, and the like. In this way, a set of hierarchical alerts can be generated and transmitted to various alert groups and/or communities.

Figure 20:
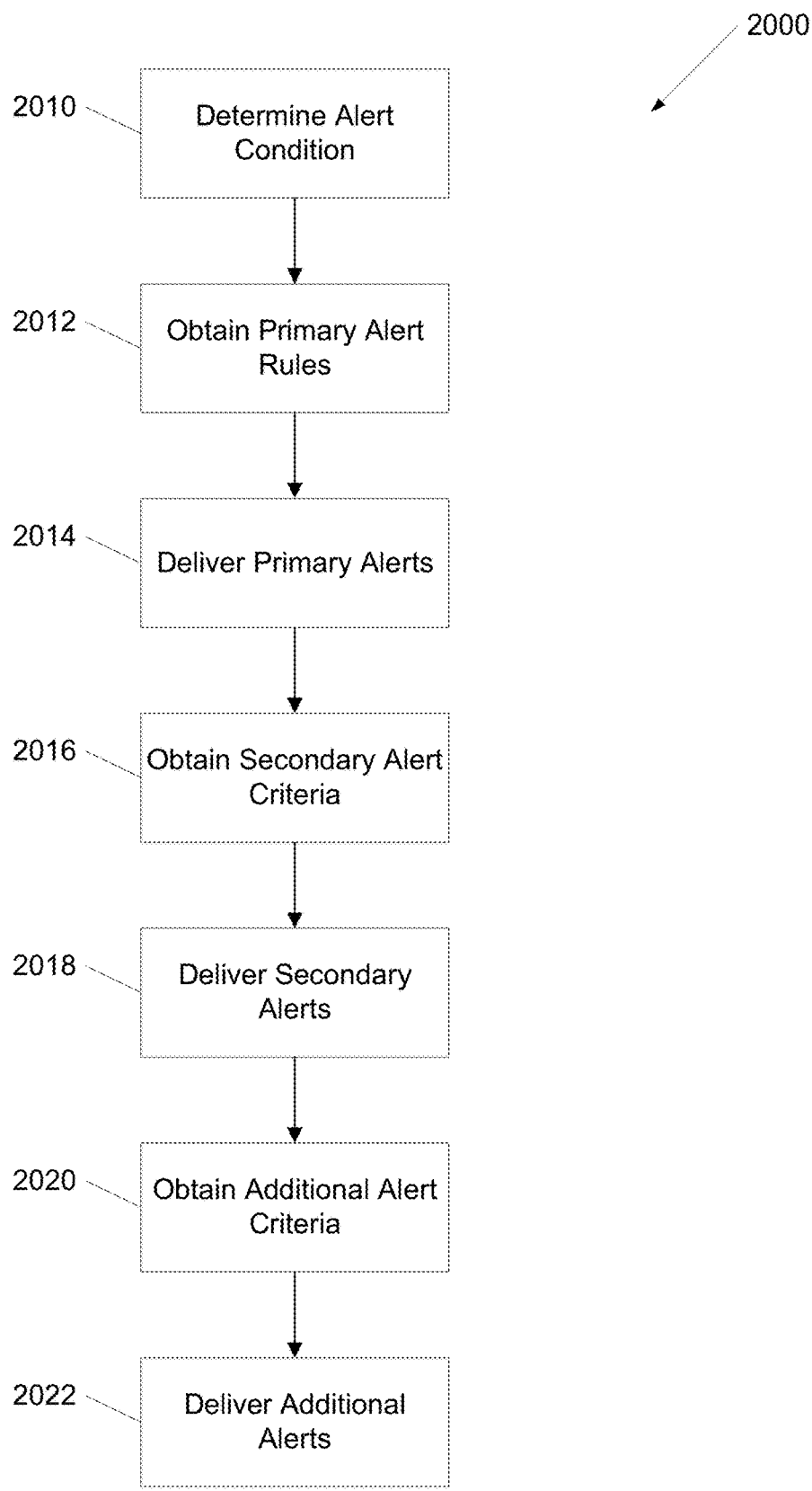
FIG. 20 depicts a flow chart of a process for conditional routing of alerts according to one or more aspects of the disclosure.

FIG. 20 depicts a flow chart of a process for conditional routing of alerts according to one or more aspects of the disclosure. Some or all of the steps of process 2000 may be performed using any of the computing devices and/or combination thereof described herein. In a variety of embodiments, some or all of the steps described below may be combined and/or divided into sub-steps as appropriate.

At step 2010, the emergency alert server system can determine if an alert condition has been provided. In several embodiments, the mobile devices are associated with a primary alert group for the community. At step 2012, the emergency alert server system can obtain primary alert rules indicating the type and content of alerts to be generated for the primary alert group based on the alert condition. For example, a spill detected by sensors in a theme park community can cause the emergency alert server system to generate an alert message to a primary alert group including facilities staff within a threshold distance of the spill. At step 2014, the emergency alert server system can transmit the alerts to the appropriate devices in the primary alert group.

The emergency alert server system can determine if a response is needed for the alert and/or if a response has been received from one or more mobile devices in the primary alert group. At step 2016, the emergency alert server system can determine if a secondary alert needs to be transmitted to a secondary alert group and obtain secondary alert criteria. The secondary alert criteria can identify a second alert group and/or the type and content of alerts to be provided to the secondary alert group based on the alert condition and/or response (not) received from the primary alert group. For example, the emergency alert server system can determine if the alerted facilities staff have received the primary alert and if at least one of the recipients has responded that they will be addressing the spill. At step 2018, the emergency alert server system can transmit the secondary alert to the appropriate mobile devices in the secondary alert group. For example, the secondary alert criteria can be set to "always," meaning there are no limiting factors on delivering a secondary alert to a secondary alert group including customer-facing employees. Accordingly, all customer-facing employees will receive the secondary alert indicating that there is a spill and the location of the spill so that the customer-facing employees can redirect visitors away from the spill location.

At step 2020, additional alert criteria can be obtained by the emergency alert server system. The tertiary alert criteria can include actions to be taken when a primary alert group has not performed an action. For example, tertiary alert criteria can include generating an alert to an administrator alert group when none of the alerted devices in the primary alert group have responded to a spill within five minutes. The emergency alert server system can generate a tertiary alert for a tertiary alert group based on the alert condition, previously generated alerts, and/or a response (or lack thereof) to those alerts. For example, a tertiary alert can inform a park administrator that no facilities staff have started the cleanup process for the spill. The emergency alert server system can transmit the additional alerts to the mobile devices indicated in the tertiary alert group at step 2022.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
obtaining an indication of an alert condition in a building;
determining that the alert condition comprises an emergency condition in the building;
determining a location for a plurality of mobile devices, each mobile device in the plurality of mobile devices being associated with a primary alert group for a community for the building;
generating an alert associated with each mobile device in the primary alert group for the building;
transmitting each alert to the associated mobile device in the plurality of mobile devices, wherein the alert causes the mobile device to display one or more notifications by overriding an alert-inhibiting state of the mobile device;

determining a response has not been received from at least one of the plurality of mobile devices within a threshold period of time;

determining a second plurality of mobile devices, each mobile device in the second plurality of mobile devices associated with a secondary alert group for the community for the building;

generating a second alert associated with each mobile device in the second plurality of mobile devices for the building; and transmitting the second alert to each mobile device in the second plurality of mobile devices.

2. The computer-implemented method of claim 1, wherein the alert comprises at least one notification selected from the group consisting of an audible notification, a visual notification, and a haptic notification.

3. The computer-implemented method of claim 1, further comprising:

determining a response has not been received from at least one of the second plurality of mobile devices within a second threshold period of time;

determining a third plurality of mobile devices, each mobile device in the second plurality of mobile devices associated with a tertiary alert group for the building;

generating a third alert associated with each mobile device in the third plurality of mobile devices for the building; and transmitting the third alert to each mobile device in the third plurality of mobile devices.

4. The computer-implemented method of claim 1, wherein:

the building comprises a school;

the primary alert group comprises one or more administrators for the school; and the secondary alert group comprises one or more teaching staff for the school.

5. The computer-implemented method of claim 1, further comprising:

obtaining a response from a first mobile device in the primary alert group, wherein the obtained response comprises an indication that the first mobile device has been unlocked within a threshold period of time of receiving the alert; and determining the first mobile device has viewed the alert.

6. The computer-implemented method of claim 1, further comprising:

generating a blockchain transaction comprising the alert and an indication of the plurality of mobile devices; and transmitting the blockchain transaction to a distributed network system, wherein the blockchain transaction causes the distributed network system to store the blockchain transaction using a blockchain ledger.

7. The computer-implemented method of claim 1, further comprising:

based on the determining a response has not been received from at least one of the plurality of mobile devices within a threshold period of time, identifying a secondary device associated with the at least one of the plurality of mobile devices; and transmitting the alert to the secondary device.

8. A computing device, comprising:

a processor; and a memory in communication with the processor and storing instructions that, when read by the processor, cause the computing device to:

obtain an indication of an alert condition in a building;

determine that the alert condition comprises an emergency condition in the building;

determine a location for a plurality of mobile devices, each mobile device in the plurality of mobile devices being associated with a primary alert group for a community for the building;

generate an alert associated with each mobile device in the primary alert group for the building;

transmit each alert to the associated mobile device in the plurality of mobile devices, wherein the alert causes the mobile device to display one or more notifications by overriding an alert-inhibiting state of the mobile device;

determine a response has not been received from at least one of the plurality of mobile devices within a threshold period of time;

determine a second plurality of mobile devices, each mobile device in the second plurality of mobile devices associated with a secondary alert group for the community for the building;

generate a second alert associated with each mobile device in the second plurality of mobile devices for the building; and transmit the second alert to each mobile device in the second plurality of mobile devices.

9. The computing device of claim 8, wherein the alert comprises at least one notification selected from the group consisting of an audible notification, a visual notification, and a haptic notification.

10. The computing device of claim 8, wherein the instructions, when read by the processor, further cause the computing device to:

determine a response has not been received from at least one of the second plurality of mobile devices within a second threshold period of time;

determine a third plurality of mobile devices, each mobile device in the second plurality of mobile devices associated with a tertiary alert group for the building;

generate a third alert associated with each mobile device in the third plurality of mobile devices for the building; and transmit the third alert to each mobile device in the third plurality of mobile devices.

11. The computing device of claim 8, wherein:

the building comprises a school;

the primary alert group comprises one or more administrators for the school; and the secondary alert group comprises one or more teaching staff for the school.

12. The computing device of claim 8, wherein the instructions, when read by the processor, further cause the computing device to:

obtain a response from a first mobile device in the primary alert group, wherein the obtained response comprises an indication that the first mobile device has been unlocked within a threshold period of time of receiving the alert; and determine the first mobile device has viewed the alert.

13. The computing device of claim 8, wherein the instructions, when read by the processor, further cause the computing device to:

generate a blockchain transaction comprising the alert and an indication of the plurality of mobile devices; and transmit the blockchain transaction to a distributed network system, wherein the blockchain transaction causes the distributed network system to store the blockchain transaction using a blockchain ledger.

14. The computing device of claim 8, wherein the instructions, when read by the processor, further cause the computing device to:
- based on the determining a response has not been received from at least one of the plurality of mobile devices within a threshold period of time, identify a secondary device associated with the at least one of the plurality of mobile devices; and
- transmit the alert to the secondary device.

15. A non-transitory machine-readable medium storing instructions that, when executed by one or more processors, cause the one or more processors to perform steps comprising:
- obtaining an indication of an alert condition in a building;
- determining that the alert condition comprises an emergency condition in the building;
- determining a location for a plurality of mobile devices, each mobile device in the plurality of mobile devices being associated with a primary alert group for a community for the building;
- generating an alert associated with each mobile device in the primary alert group for the building;
- transmitting each alert to the associated mobile device in the plurality of mobile devices, wherein the alert causes the mobile device to display one or more notifications by overriding an alert-inhibiting state of the mobile device;
- determining a response has not been received from at least one of the plurality of mobile devices within a threshold period of time;
- determining a second plurality of mobile devices, each mobile device in the second plurality of mobile devices associated with a secondary alert group for the community for the building;
- generating a second alert associated with each mobile device in the second plurality of mobile devices for the building; and
- transmitting the second alert to each mobile device in the second plurality of mobile devices.

16. The non-transitory machine-readable medium of claim 15, wherein the alert comprises at least one notification selected from the group consisting of an audible notification, a visual notification, and a haptic notification.

17. The non-transitory machine-readable medium of claim 15, wherein the instructions, when executed by one or more processors, further cause the one or more processors to perform steps comprising:
- determining a response has not been received from at least one of the second plurality of mobile devices within a second threshold period of time;
- determining a third plurality of mobile devices, each mobile device in the second plurality of mobile devices associated with a tertiary alert group for the building;
- generating a third alert associated with each mobile device in the third plurality of mobile devices for the building; and
- transmitting the third alert to each mobile device in the third plurality of mobile devices.

18. The non-transitory machine-readable medium of claim 15, wherein the instructions, when executed by one or more processors, further cause the one or more processors to perform steps comprising:
- generating a blockchain transaction comprising the alert and an indication of the plurality of mobile devices; and
- transmitting the blockchain transaction to a distributed network system, wherein the blockchain transaction causes the distributed network system to store the blockchain transaction using a blockchain ledger.

19. The non-transitory machine-readable medium of claim 15, wherein the instructions, when executed by one or more processors, further cause the one or more processors to perform steps comprising:
- based on the determining a response has not been received from at least one of the plurality of mobile devices within a threshold period of time, identifying a secondary device associated with the at least one of the plurality of mobile devices; and
- transmitting the alert to the secondary device.

20. The non-transitory machine-readable medium of claim 19, wherein:
- the building comprises a school;
- the primary alert group comprises one or more administrators for the school; and
- the secondary alert group comprises one or more teaching staff for the school.

* * * * *